US009870745B2

(12) United States Patent
Kawamura et al.

(10) Patent No.: US 9,870,745 B2
(45) Date of Patent: Jan. 16, 2018

(54) DISPLAY DEVICE AND DRIVING CIRCUIT

(71) Applicant: Panasonic Liquid Crystal Display Co., Ltd., Himeji-shi, Hyogo (JP)

(72) Inventors: Tetsuya Kawamura, Hyogo (JP); Hironori Yasukawa, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 74 days.

(21) Appl. No.: 14/867,417

(22) Filed: Sep. 28, 2015

(65) Prior Publication Data
US 2016/0093261 A1  Mar. 31, 2016

(30) Foreign Application Priority Data
Sep. 29, 2014  (JP) ................................. 2014-199437

(51) Int. Cl.
*G09G 3/36* (2006.01)
*G02F 1/1345* (2006.01)
*G02F 1/1362* (2006.01)

(52) U.S. Cl.
CPC ......... *G09G 3/3648* (2013.01); *G02F 1/1345* (2013.01); *G09G 3/3611* (2013.01); *G02F 1/136286* (2013.01); *G09G 2300/0426* (2013.01); *G09G 2300/0465* (2013.01); *G09G 2310/0264* (2013.01); *G09G 2310/0281* (2013.01); *G09G 2310/08* (2013.01)

(58) Field of Classification Search
None
See application file for complete search history.

(56) References Cited

U.S. PATENT DOCUMENTS

| 2003/0030381 | A1  | 2/2003  | Yamazaki et al. |
| 2005/0140578 | A1  | 6/2005  | Yamazaki et al. |
| 2006/0071884 | A1* | 4/2006  | Kim ..................... G09G 3/3233 345/76 |
| 2010/0073272 | A1  | 3/2010  | Yamazaki et al. |
| 2012/0313907 | A1  | 12/2012 | Yamazaki et al. |
| 2014/0152938 | A1* | 6/2014  | Lee ...................... G09G 3/3648 349/46 |
| 2014/0375534 | A1* | 12/2014 | Lee ...................... G09G 3/3648 345/87 |
| 2015/0379955 | A1* | 12/2015 | Jeon .................... G09G 3/3648 345/212 |
| 2016/0020224 | A1* | 1/2016  | Kawamura ....... G02F 1/136286 345/213 |

FOREIGN PATENT DOCUMENTS

JP  2003-058075 A  2/2003

* cited by examiner

*Primary Examiner* — Duane N Taylor, Jr.
(74) *Attorney, Agent, or Firm* — Hamre, Schumann, Mueller & Larson, P.C.

(57) ABSTRACT

Provided is a display device, including: a driving circuit including a first output terminal group including at least one gate signal output terminal, and a second output terminal group including at least one source signal output terminal; and a plurality of gate lead-out lines configured to transmit a gate signal to a plurality of gate lines, in which each or the plurality of gate lines is electrically connected to at least one of the gate lead-out lines, and the first output terminal group is arranged between two adjacent second output terminal groups.

10 Claims, 22 Drawing Sheets

FIG.14
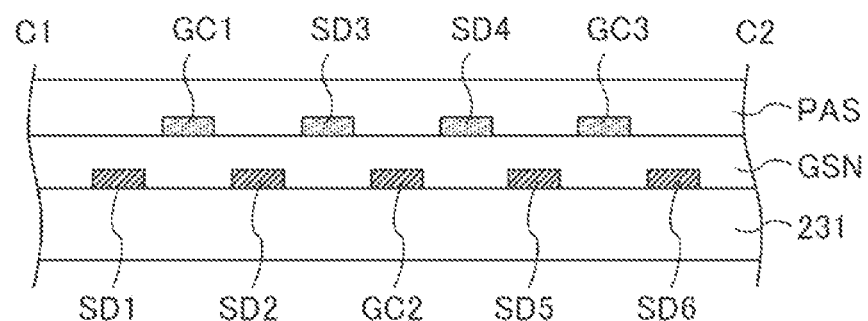
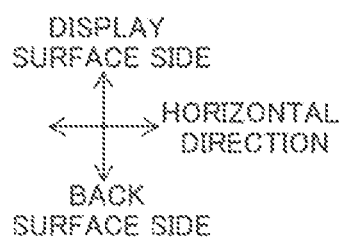

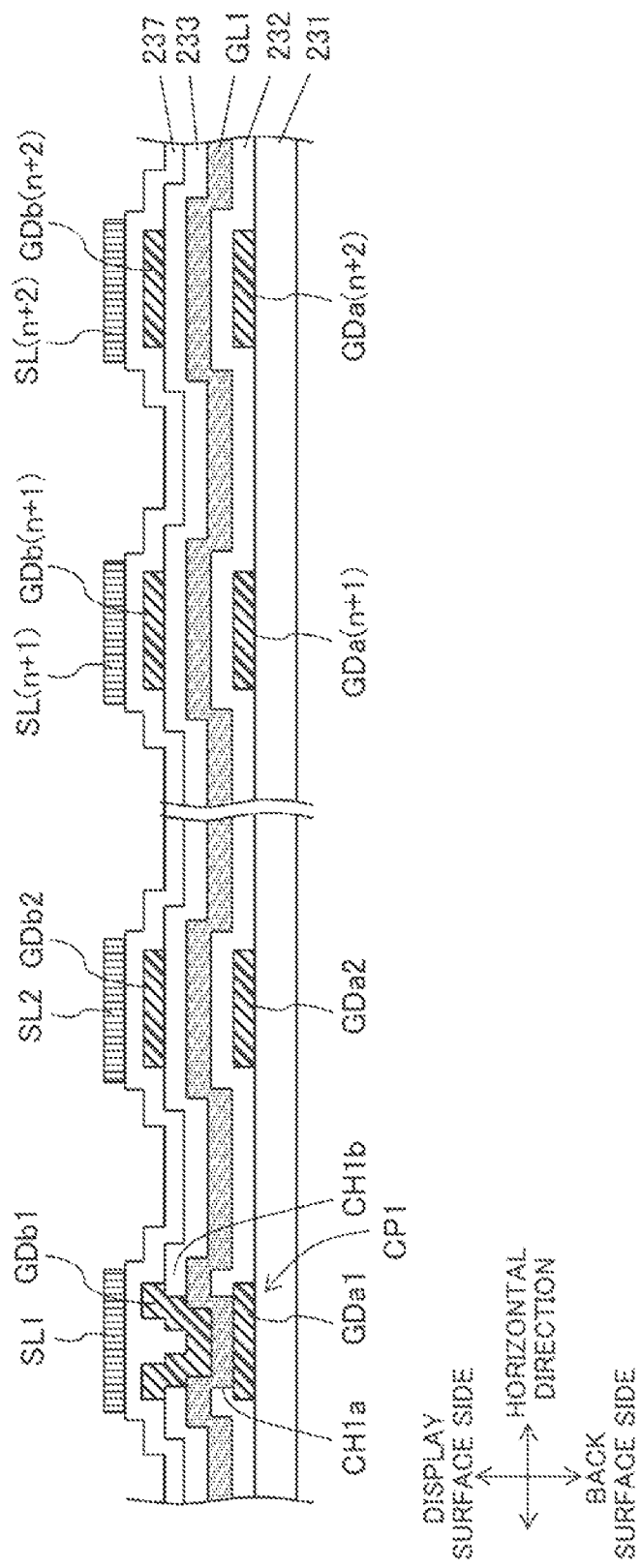

DISPLAY DEVICE AND DRIVING CIRCUIT

CROSS-REFERENCE TO RELATED APPLICATION

The present application claims priority from Japanese application JP2014-199437 filed on Sep. 29, 2014, the content of which is hereby incorporated by reference into this application.

BACKGROUND OF THE INVENTION

1. Field of the Invention

The present application relates to a display device and a driving circuit to be formed in the display device.

2. Description of the Related Art

Hitherto, in display devices such as liquid crystal display devices, there has been proposed a technology for realizing reduction in area of a frame region surrounding a display region (so-called narrowing of a frame). For example, in Japanese Patent Application Laid-open No. 2003-58075, there is disclosed a configuration in which a gate signal line driving circuit (gate driver) and s source signal line driving circuit (source driver) are arranged parallel to each other on one side (upper side) of the display region, to thereby narrow the frame.

SUMMARY OF THE INVENTION

In the configuration disclosed in the above-mentioned literature, the area of the fraise region in the lateral direction can be decreased. However, the area of the frame region in the vertical direction in which the gate signal line driving circuit and the source signal line driving circuit are arranged is increased. As a result, it is difficult to decrease the area of the frame region as the entire liquid crystal display device.

The present application has been made in view of the above-mentioned circumstances, and has an object to provide a display device and a driving circuit capable of decreasing the area of the frame region surrounding the display region.

In order to solve the above-mentioned problem, according to one embodiment of the present application, there is provided a display device, including: a plurality of gate lines extending in a first direction; a plurality of source lines extending in a second direction different from the first direction; a driving circuit including: a first output terminal group including at least one gate signal output terminal configured to output a gate signal; and a second output terminal group including at least one source signal output terminal configured to output a source signal; and a plurality of gate lead-out lines extending in the second direction and being configured to transmit the gate signal output from the at least one gate signal output terminal to the plurality of gate lines, in which each of the plurality of gate lines is electrically connected to at least one of the plurality of gate lead-out lines, and in which the first output terminal group is arranged between two second output terminal groups adjacent to each other in the first direction.

The display device according to one embodiment of the present application may further include a plurality of source lead-out lines configured to transmit the source signal output from the at least one source signal output terminal to the plurality of source lines. In the display device, outside a display region, the plurality of source lead-out lines and the plurality of gate lead-out lines may be arranged so as to avoid intersecting with each other in plan view.

In the display device according to one embodiment of the present application, at least one of the plurality of gate lines may be electrically connected to at least two of the plurality of gate lead-out lines.

The display device according to one embodiment of the present application may further include a plurality of gate bundled lines formed by bundling a predetermined number of the plurality of gate lead-out lines outside a display region. In the display device, each of the plurality of gate bundled lines may be electrically connected to each of a plurality of the gate signal output terminals, and may be configured to transmit the gate signal output from each of the plurality of the gate signal output terminals to the predetermined number of the plurality of gate lead-out lines.

In the display device according to one embodiment of the present application, the each of the plurality of gate bundled lines may be formed by bundling a plurality of adjacent gate lead-out lines outside the display region.

The display device according to one embodiment of the present application may further include a plurality of source lead-out lines configured to transmit the source signal output from the at least one source signal output terminal to the plurality of source lines. In the display device, outside the display region, the plurality of source lead-out lines and the plurality of gate bundled lines may be arranged so as to avoid intersecting with each other in plan view.

The display device according to one embodiment of the present application may further include a first insulating film formed between the plurality of gate lines and the plurality of gate lead-out lines. In the display device, the each of the plurality of gate lines and each of the plurality of gate lead-out lines may be electrically connected to each other via a contact hole forced through the first insulating film.

In the display device according to one embodiment of the present application, each of the plurality of gate lead-out lines may have a width that is equal to or less than a width of each of the plurality of source lines, and, inside the display region, the each of the plurality of gate lead-out lines and the each of the plurality of source lines may overlap with each other in plan view.

The display device according to one embodiment of the present application may farther include a second insulating film formed between the plurality of gate lines and the plurality of source lines. In the display device, the first insulating film may be formed on the plurality of gate lead-out lines, the plurality of gate lines may be formed on the first insulating film, the second insulating film may be formed on the plurality of gate lines, and the plurality of source lines may be formed on the second insulating film.

The display device according to one embodiment of the present application may further include a transistor connected to a pixel electrode in a pixel region sectioned by adjacent two of the plurality of source lines, adjacent two of the plurality of gate lines, and four intersecting portions at which the adjacent two of the plurality of source lines and the adjacent two of the plurality of gate lines intersect with each other. In the display device, the transistor being arranged at one intersecting portion different from another intersecting portion at which a connecting portion formed between corresponding one of the plurality of gate lines and corresponding one of the plurality of gate lead-out lines is positioned.

According to one embodiment of the present application, there is provided a driving circuit, which is configured to respectively output a gate signal and a source signal to a gate line and a source line formed in a display panel, the driving circuit including: a first output terminal group including at least one gate signal output terminal configured to output the gate signal; and a second output terminal group including at least one source signal output terminal configured to output the source signal, in which the first output terminal group is arranged between two adjacent second output terminal groups.

In the driving circuit according to one embodiment of the present application, the first output terminal group may include at least three first output terminal groups, and a number of the source signal output terminals arranged between two of the at least three first output terminal groups, which are adjacent to each other in the first direction, may be equal to a number of the source signal output terminals arranged between other two of the at least three first output terminal groups, which are adjacent to each other in the first direction.

BRIEF DESCRIPTION OF THE DRAWINGS

FIG. 14 is a sectional view taken along the line C1-C2 of FIG. 11.

FIG. 22 is a sectional view in the liquid crystal display device according to a fourth embodiment of the present application.

DETAILED DESCRIPTION OF THE INVENTION

One embodiment of the present application is described below with reference to the drawings. In the following, a liquid crystal display device is given as an example, but the display device according to the present application is not limited to a liquid crystal display device, and may be an organic electroluminescence (EL) display device, for example. Further, in the following, a plurality of modes of the liquid crystal display device are described. Descriptions of components and functions common in respective embodiments are omitted as appropriate.

First Embodiment

Figure 1:
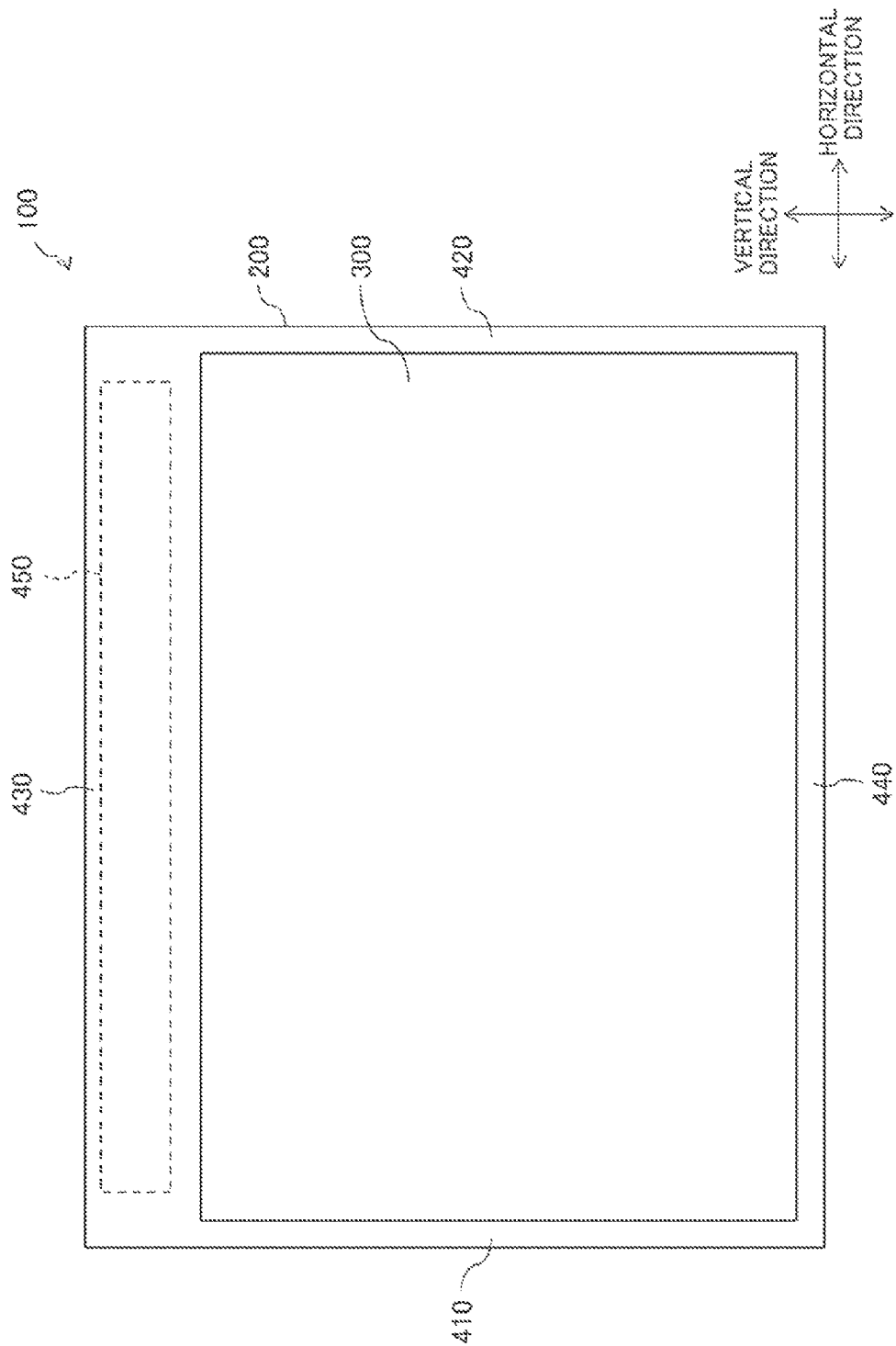
FIG. 1 is a plan view for illustrating a schematic configuration of a liquid crystal display device according to a first embodiment of the present application.

FIG. 1 is a plan view for illustrating a schematic configuration of a liquid crystal display device according to a first embodiment of the present application. A liquid crystal display device 100 mainly includes a display panel 200, and a backlight unit (not shown) arranged on the back surface side of the display panel 200. The display panel 200 includes, when roughly divided in region, a display region 300 for displaying an image, and a frame region positioned around the display region 300. The frame region, includes, as viewed from a viewer, a left region 410 on the leftward outer side (left side) of the display region 300, a right region 420 on the rightward outer side (right side) of the display region 300, an upper region 430 on the upward outer side (upper side) of the display region 300, and a lower region 440 on the downward outer side (lower side) of the display region 300.

The frame region includes, on one side thereof, a driving circuit region 450 for arranging driving circuits (hereinafter referred to as driver ICs) for displaying an image. In this liquid crystal display device 100, the driving circuit region 450 is included in the upper region 430. The location of the driving circuit region 450 in the frame region 400 is not limited, and is determined depending on the structure of the liquid crystal display device 100 (such as a vertical type or a lateral type). Further, the driving circuit region 450 may be included in the frame region 400 on only one side, or may be included on two opposing sides across the display region 300. Further, the driving circuit region 450 may be included in a circuit board provided outside of the display panel 200. The driving circuit region 450 may include, in addition to the driver ICs, a common voltage generating circuit and a control circuit (not shown). The liquid crystal display device 100 can employ a mounting system referred to as a so-called chip on glass (COG) in which a driver IC is directly mounted onto a glass substrate of the display panel 200. Detailed, configuration of a driver IC 210 is described later with reference to FIG. 11. In the following, the entire configuration of the display panel 200 is described with reference to FIG. 11 as appropriate.

Figure 2:
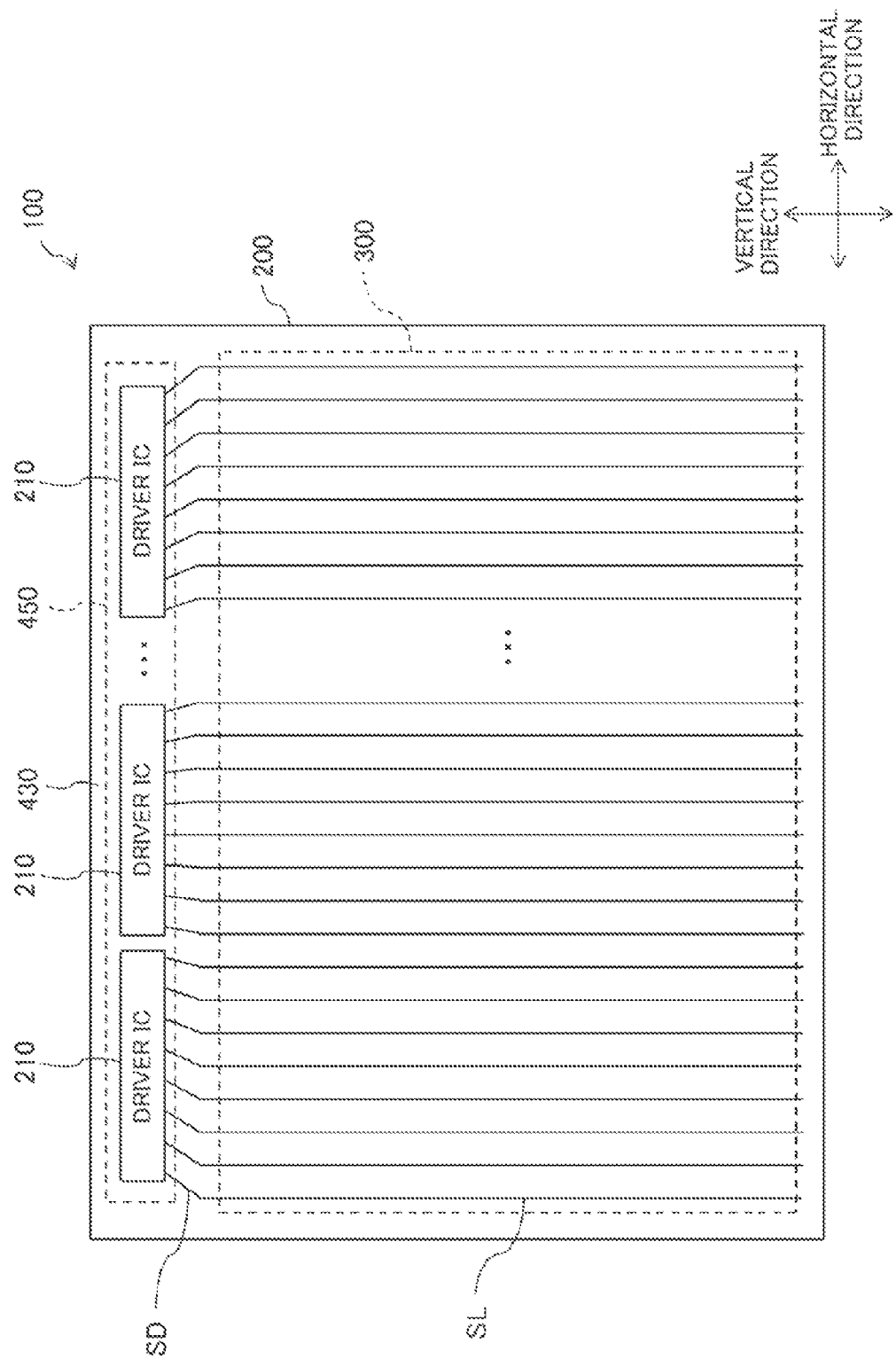
FIG. 2 is a plan view for illustrating arrangement of driver ICs and source lines.

FIG. 2 is a plan view for illustrating arrangement of the driver ICs and source lines. The liquid crystal display device 100 includes a plurality of source lines SL, a plurality of source read-out lines SD, and a plurality of driver ICs 210. Each driver IC 210 includes a plurality of source signal output terminals ST (second output terminals) configured to output a video signal (source signal) to the respective source lines SL, and a plurality of gate signal output terminals GT (first output terminals) configured to output a scanning signal (gate signal) to the respective gate lines GL (see FIG. 11). The plurality of driver ICs 210 are arranged side by side in the horizontal direction in the upper region 430. Note that, the plurality of driver ICs 210 may be separately arranged in the upper region 430 and the lower region 440. Each source lead-out line SD is connected to each source signal output terminal ST of the driver IC 210. Each source line SL is electrically connected to each source lead-out line SD outside the display region, and is extended in the vertical direction (second direction) inside the display region. Each source line SL and each source lead-out line SD may be directly connected to each other in the same layer, or may be connected in different layers via a contact hole. Further, the plurality of source lines SL are arranged at substantially equal intervals in a horizontal direction (first direction).

Figure 3:
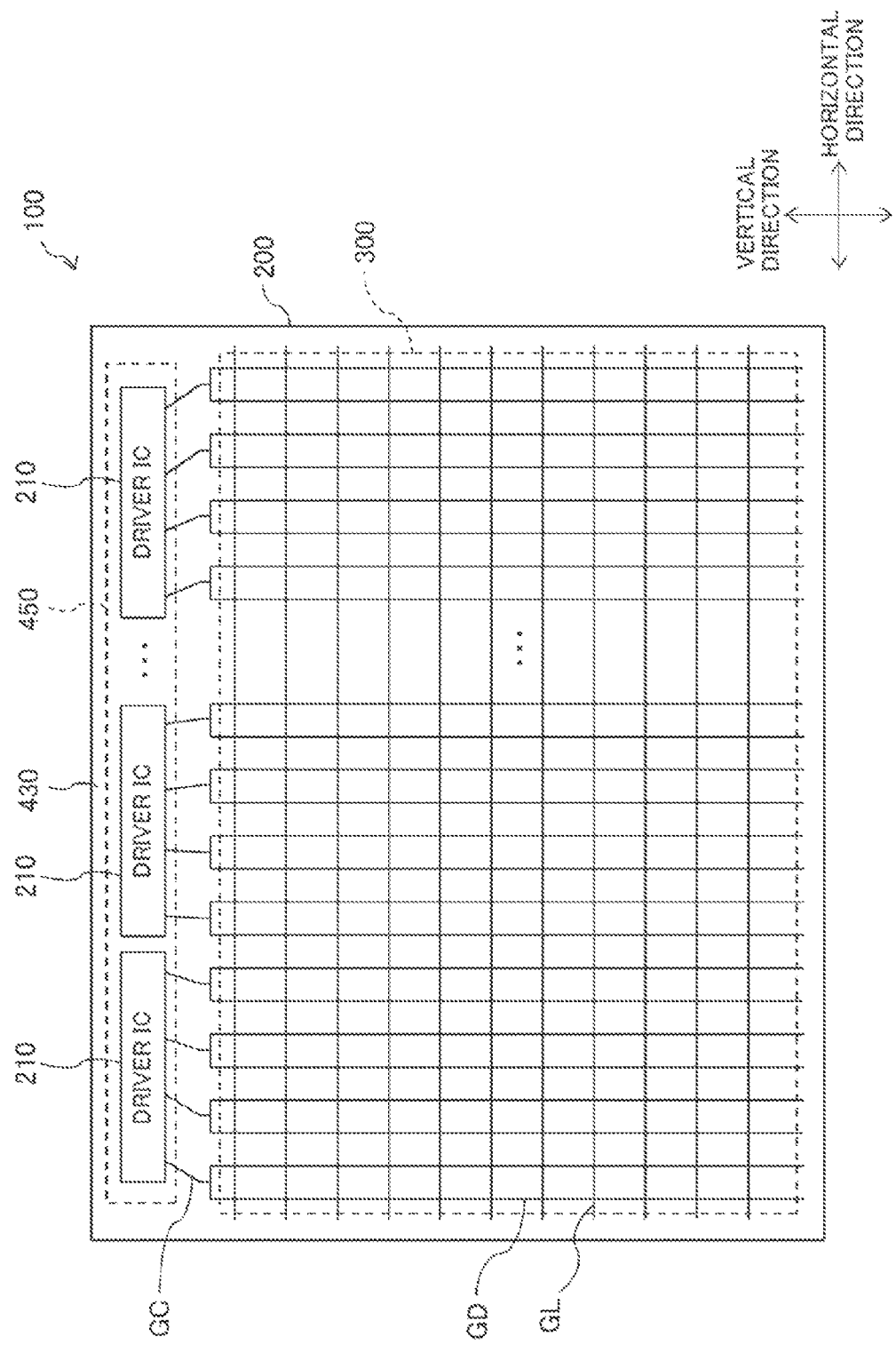
FIG. 3 is a plan view for illustrating arrangement of the driver ICs and gate lines.

FIG. 3 is a plan view for illustrating arrangement of the driver ICs and gate lines. The liquid crystal display device 100 further includes a plurality of gate lines GL, a plurality of gate lead-out lines GD, and a plurality of gate bundled lines GC. Each gate line GL is extended in the horizontal direction. Further, the plurality of gate lines GL are arranged at substantially equal intervals in the vertical direction. Each gate lead-out line GD is extended in the vertical direction in the display region 300, and the plurality of gate lead-out lines GD are arranged at substantially equal intervals in the horizontal direction. Further, the plurality of gate lead-out lines GD are bundled into pairs to be electrically connected to each gate bundled line GC outside the display region on the driver IC 210 side. Each gate bundled line GC is connected to each gate signal output terminal GT of the driver IC 210 (see FIG. 11). In plan view, the gate lead-out line GD is arranged to intersect with the gate line GL, and so that the gate lead-out line GD and the source line SL over lap with each other. At the intersecting portion with the gate line GL, the gate lead-out line GD is electrically connected to the gate line GL. Details are described later, but the source line SL, the gate line GL, and the gate lead-out line GD are formed in layers different from each other through intermediation of insulating films.

Each source signal output terminal ST of each driver IC 210 outputs a source signal to each source lead-out line SD, and each source lead-out line SD transmits the source signal to each source line SL. Further, each gate signal output terminal GT of each driver IC 210 outputs a gate signal, to each gate bundled line GC, and each gate lead-out line GD transmits the gate signal to each gate line GL. The display panel 200 displays an image in the display region 300 based on the source signal and the gate signal.

The display region 300 of this liquid crystal display device 100 is not particularly limited in shape, and has a horizontally-long shape, for example. For example, the screen ratio (width:height) of the liquid crystal display device 100 may be 16:9, 16:10, or 15:10. In this case, the ratio (m:n) between the number (m) of the source lines SL (for respective RGB) and the number (n) of the gate lines GL is 48:9, 48:10, or 45:10. Further, the ratio (m/n) of the number of the source lines SL to one gate line GL is 5.3, 4.8, or 4.5. As described above, the liquid crystal display device 100 has a configuration in which the number (m) of the source lines SL is larger than the number (n) of the gate lines (m>n).

Figure 4:
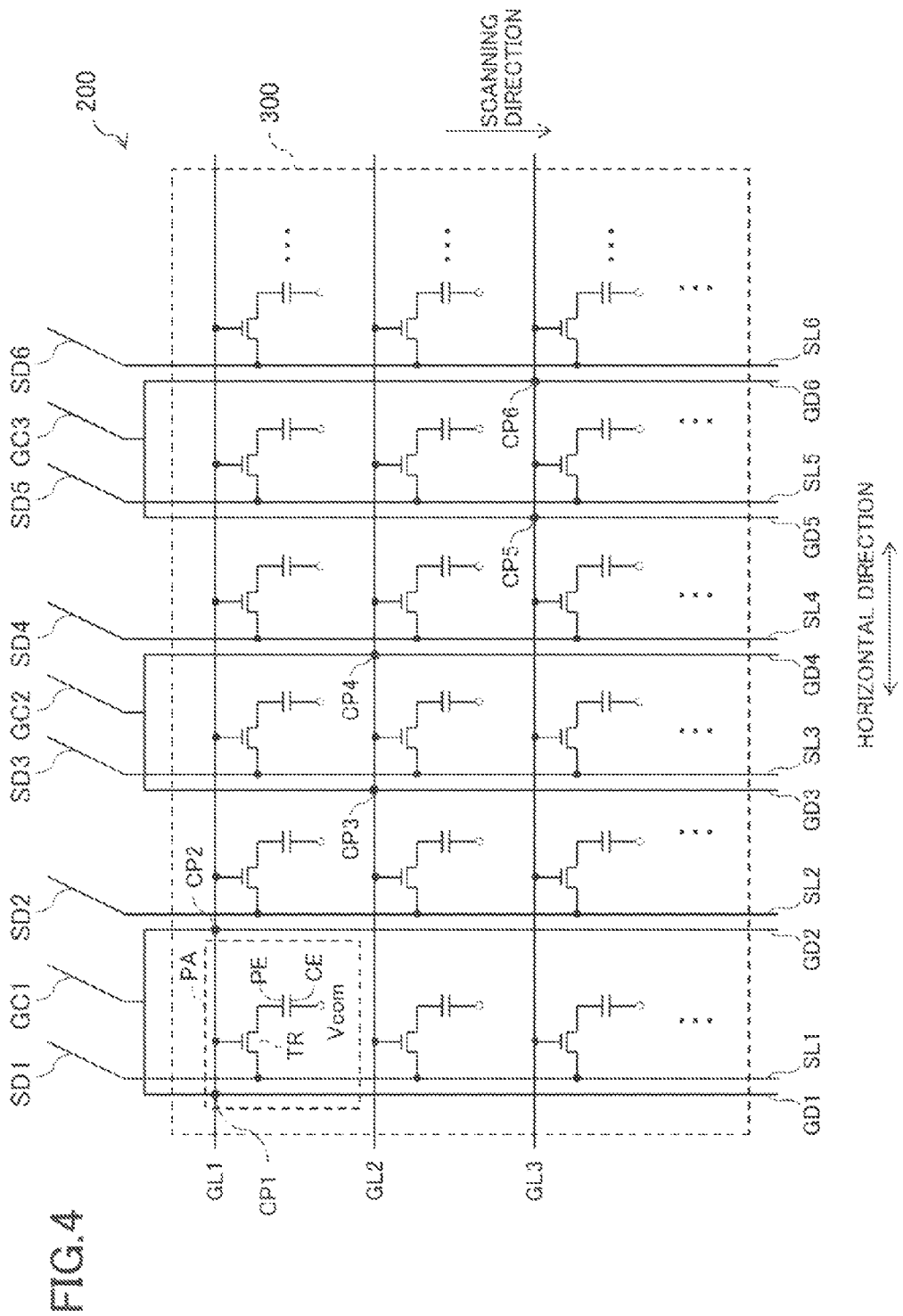
FIG. 4 is a circuit diagram for illustrating a schematic configuration of pixel regions of a display panel.

FIG. 4 is a circuit diagram for illustrating a schematic configuration of pixel regions of the display panel 200. In FIG. 4, for convenience in description, the gate lead-out line GD and the source line SL are arranged parallel side by side in plan view, but in the lamination structure of this liquid crystal display device 100, those lines may be arranged to overlap with each other.

In the display region 300 of the display panel 200, a plurality of pixel regions PA sectioned by the plurality of (n) gate lines GL and the plurality of (m) source lines SL are arranged in matrix. The display panel 200 includes a plurality of pixel electrodes PE formed in the plurality of pixel regions PA, a common electrode CE corresponding to the plurality of pixel electrodes PE, and a plurality of transistors TR formed in vicinities of respective intersecting portions between the respective gate lines GL and the respective source lines SL. Each gate lead-out line GD is electrically connected to one gate line GL at one of a plurality of intersecting portions between the gate lead-out line GD and the plurality of gate lines GL. The intersecting portion at which, the gate lead-out line CD and the gate line GL are electrically connected to each other is referred to as a "connecting portion CP".

Further, two adjacent gate lead-out lines GD are bundled into one line to be electrically connected to one gate bundled line GC. For example, as illustrated in FIG. 4, gate lead-out lines GD1 and GD2 are electrically connected to a gate bundled line GC1, gate lead-out lines GD3 and GD4 are electrically connected to a gate bundled line GC2, and gate lead-out lines GD5 and GD6 are electrically connected to a gate bundled line GC3. The gate bundled, lines GC and the gate lead-out line may be directly connected to each other in the same layer, or may be electrically connected in different layers via a contact hole.

The connecting portions CP are arranged in accordance with a certain rule based on a scanning direction (vertical direction) in which the plurality of gate lines GL are arranged, and based on the horizontal direction in which the gate lead-out lines GD are arranged. Further, two connecting port ions CP are arranged for one gate line GL. For example, as illustrated in FIG. 4, a connecting portion CP1 is arranged at an intersecting portion between a gate line GL1 and a gate lead-out line GD1, a connecting portion CP2 is arranged at an intersecting portion between the gate line GL1 and a gate lead-out line GD2, a connecting portion CP3 is arranged at an intersecting portion between a gate line GL2 and a gate lead-out line GD3, a connecting portion CP4 is arranged at an intersecting portion between the gate line GL2 and a gate lead-out line GD4, a connecting portion CP5 is arranged at an intersecting portion between a gate line GL3 and a gate lead-out line GD5, and a connecting portion CP6 is arranged at an intersecting portion between the gate line GL3 and a gate lead-out line GD6.

As described above, in the example illustrated in FIG. 4, two connecting portions CP are arranged for one gate line GL, and two gate lead-out lines GD are electrically connected to each gate line GL.

Figure 5:
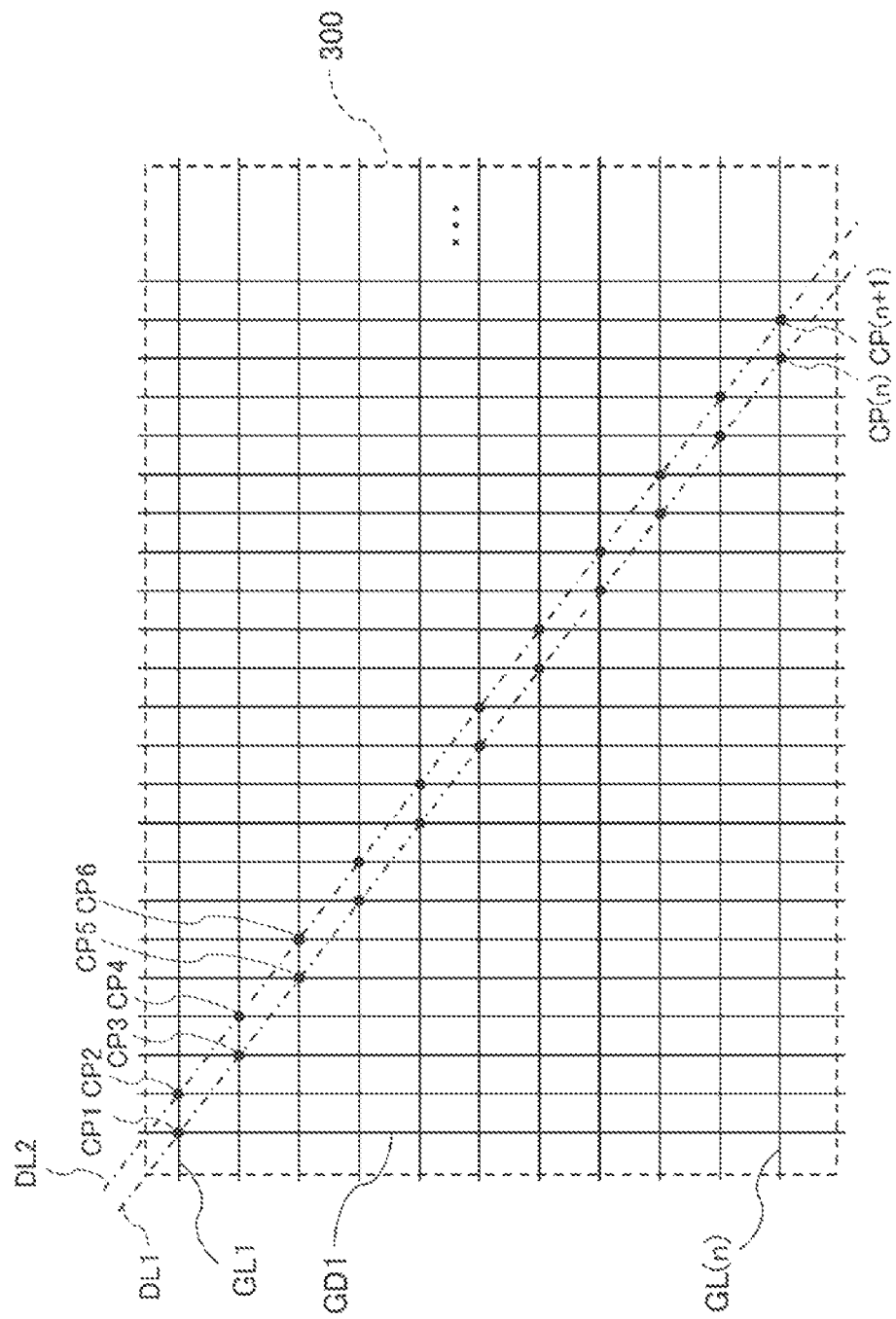
FIG. 5 is a plan view for schematically illustrating arrangement of connecting portions.

FIG. 5 is a plan view for schematically illustrating the arrangement of the connecting portions CP in the display region 300. As illustrated in FIG. 5, in the display region 300, the connecting portion CP1 is arranged at the upper left end, the connecting portion CP2 is arranged adjacent to the connecting portion CP1 on the right, the connecting portion CP3 is arranged at the lower right of the connecting portion CP2, and the connecting portion CP4 is arranged adjacent to the connecting portion CP3 on the right. As described above, the left connecting portion CP of the two adjacent connecting portions CP is arranged on a diagonal line DL1, and the right connecting portion CP is arranged on a diagonal line DL2. With this, all of the gate lines GL from the first gate line to the n-th gate line are each electrically connected to two gate lead-out lines GD at two connecting portions CP. Note that, the connecting portions CP are arranged so that the diagonal lines DL1 and DL2 are parallel to each other. Note that, the arrangement of the connecting portions CP is not limited to the above-mentioned configuration.

Figure 6:
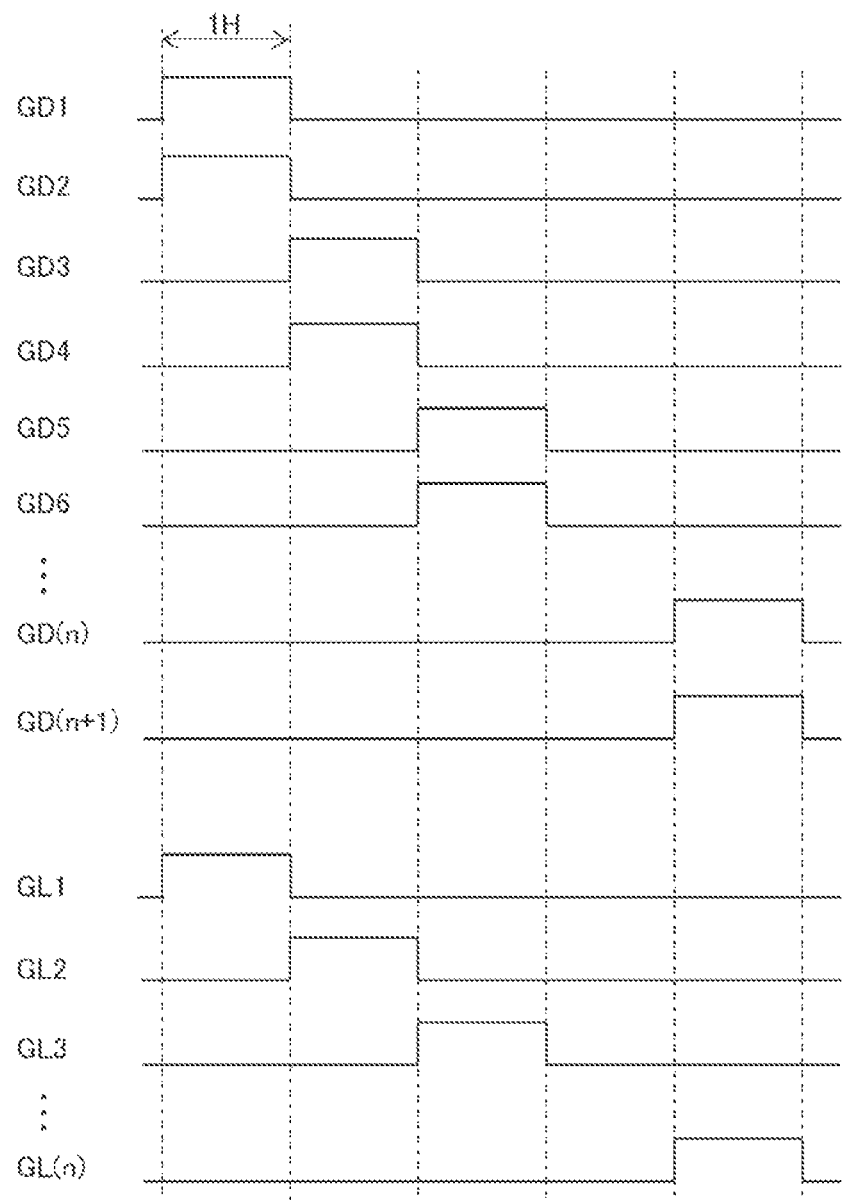
FIG. 6 is a timing chart for illustrating output timings of a gate signal.

Next, a method of driving the driver IC 210 is described. FIG. 6 is a timing chart for illustrating output timings of a gate signal output from the gate signal output terminal GT of the driver IC 210. The driver IC 210 sequentially supplies the gate signal (on voltage, off voltage) to each gate line GL. Further, two gate lead-out lines GD are electrically connected to each gate line GL, and the gate signal output from one gate signal output terminal GT is supplied to one gate line GL through one gate bundled line GC and two gate lead-out lines GD. Therefore, the gate signal output from the gate signal output terminal GT is supplied simultaneously to two gate lead-out lines GD.

Specifically, in a first horizontal scanning period, the gate signal output terminal GT of the driver IC 210 outputs the on voltage simultaneously to the gate lead-out lines GD1 and GD2, to thereby supply the on voltage to the gate line GL1. Subsequently, in a second horizontal scanning period, the gate signal output terminal GT outputs the on voltage simultaneously to the gate lead-out lines GD3 and GD4, to thereby supply the on voltage to the gate line GL2. Subsequently, in a third horizontal scanning period, the gate signal output terminal GT outputs the on voltage simultaneously to the gate lead-out lines GD5 and GD6, to thereby supply the on voltage to the gate line GL3. As described above, the gate signal (on voltage, off voltage) is sequentially supplied from the first gate line GL1 to the n-th gate line GL(n).

The source signal output terminal ST of the driver IC 210 outputs the source signal to each source line SL through each source lead-out line SD in synchronization with the output timing of the on voltage and the off voltage of the gate signal. A known configuration can be applied to the configuration of outputting the source signal by the driver IC 210.

Figure 7:
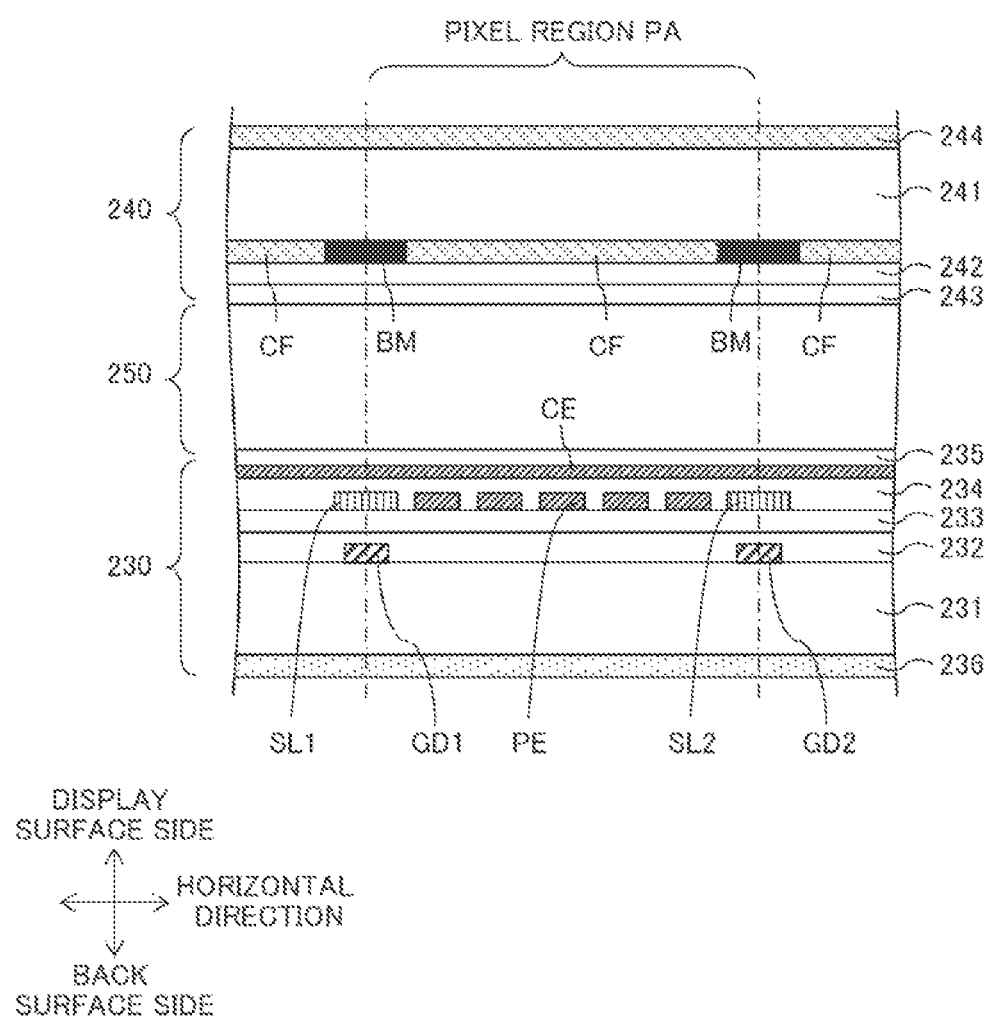
FIG. 7 is a sectional view for illustrating a schematic configuration of the display panel.
Figure 8:
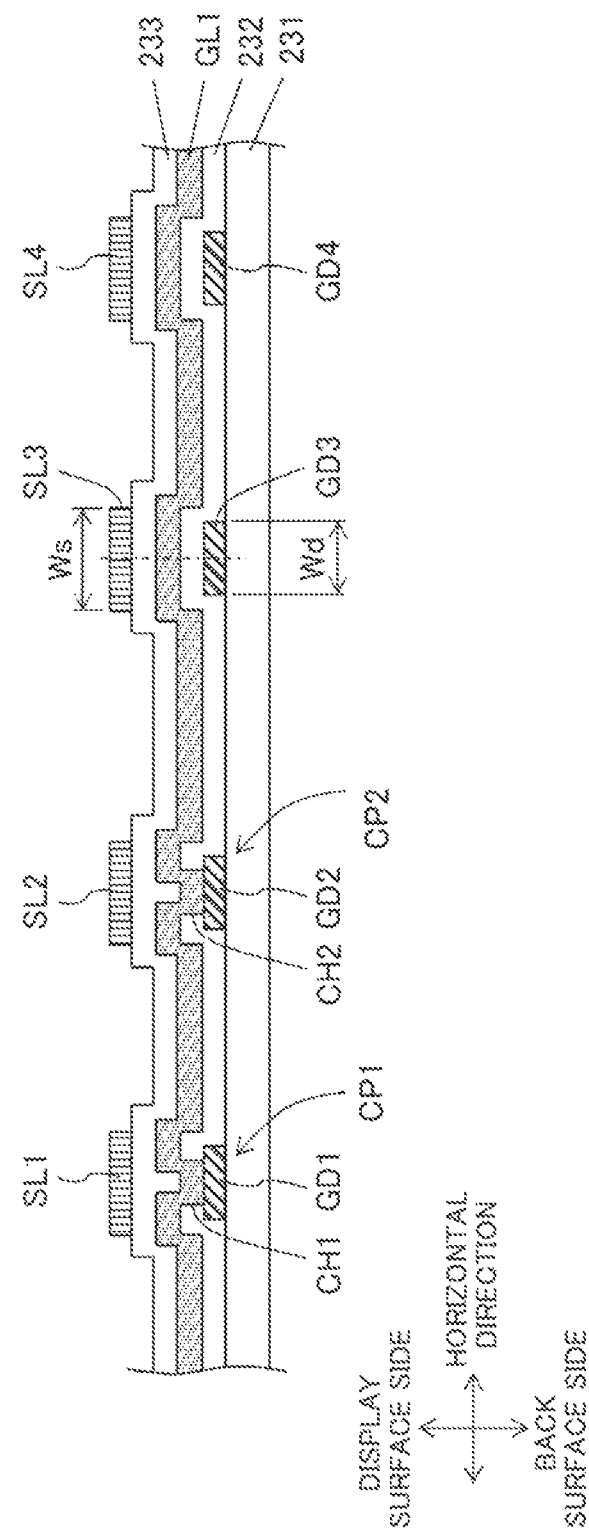
FIG. 8 is a sectional view for illustrating a schematic configuration of the display panel.
Figure 9:
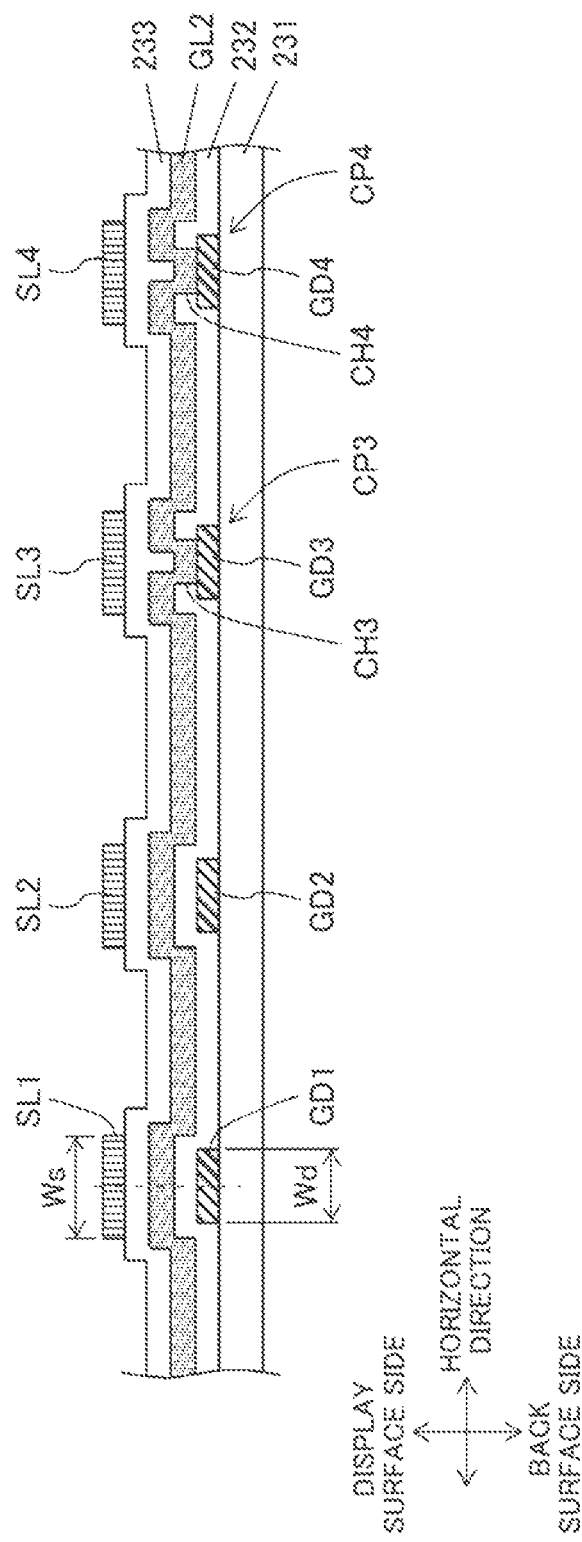
FIG. 9 is a sectional view for illustrating a schematic configuration of the display panel.

FIG. 7 to FIG. 9 are sectional views for illustrating a schematic configuration of the display panel 200. FIG. 7 is a sectional view of a case where the pixel region PA between the gate line GL1 and the gate line GL2 is cut in the horizontal direction. FIG. 8 is a sectional view of a case where a region along the gate line GL1 is cut in the horizontal direction. FIG. 9 is a sectional view of a case where a region along the gate line GL2 is cut in the horizontal direction. Note that, in FIG. 8 and FIG. 9, a part of a thin film transistor substrate (TFT substrate) is illustrated.

The display panel 200 includes a thin film transistor substrate (TFT substrate 230) arranged on a back surface side, a color filter substrate (CF substrate 240) arranged on a display surface side and opposed to the TFT substrate 230, and a liquid crystal layer 250 sandwiched between the TFT substrate 230 and the CF substrate 240. In the TFT substrate 230, the gate lead-out lines GD are formed on a glass substrate 231, a first insulating film 232 is formed so as to cover the gate lead-out lines GD, the gate lines GL are formed on the first insulating film 232, a second insulating film 233 is formed so as to cover the gate lines GL, and the source lines SL are formed on the second insulating film 233. Further, on the second insulating film 233, the pixel electrode PE is formed so that a part thereof overlaps with the source line SL, a third insulating film 234 is formed so as to cover the pixel electrode PE, the common electrode CE is formed on the third insulating film 234, and an alignment film 235 is formed so as to cover the source lines SL and the common electrode CE. The pixel electrode PE has slits formed therein. In the CF substrate 240, a black matrix BM and color filters CF are formed on a glass substrate 241, an overcoat film 242 is formed so as to cover those films, and an alignment film 243 is formed on the overcoat film 242. On the outer sides of the TFT substrate 230 and the CE substrate 240, polarizing plates 236 and 244 are formed.

As illustrated in FIG. 3, a contact hole CH1 is formed through the first insulating film 232 above the gate lead-out line GD1, and a metal material of the gate line GL1 is filled in the contact hole CH1. A part in the contact hole CH1 where the gate lead-out line GD1 and the metal material of the gate line GL1 are brought into contact with each other forms the connecting portion CP1, and the gate lead-out line GD1 and the gate line GL1 are electrically connected to each other at the connecting portion CP1. Further, a contact hole CH2 is formed through the first insulating film 232 above the gate lead-out line GD2, and a metal material of the gate line GL1 is filled in the contact hole CH2. A part of the contact hole CH2 where the gate lead-out line GD2 and the metal material of the gate line GL1 are brought into contact with each other forms the connecting portion CP2, and the gate lead-out line GD2 and the gate line GL1 are electrically connected to each other at the connecting portion CP2. As described above, the gate line GL1 is electrically connected to two gate lead-cut lines GD1 and GD2 at two connecting portions CP1 and CP2.

Similarly, as illustrated in FIG. 9, a contact hole CH3 is formed through the first insulating film 232 above the gate lead-out line GD3, and a metal material of the gate line GL2 is filled in the contact hole CH3. A part in the contact hole CH3 where the gate lead-out line GD3 and the metal material of the gate line GL2 are brought into contact with each other forms the connecting portion CP3, and the gate lead-cut line GD3 and the gate line GL2 are electrically connected to each other at the connecting portion CP3. Further, a contact hole CH4 is formed through the first insulating film 232 above the gate lead-out line GD4, and a metal material of the gate line GL2 is filled in the contact hole CH4. A part of the contact hole CH4 where the gate lead-out line GD4 and the metal material of the gate line GL2 are brought into contact with each other forms the connecting portion CP4, and the gate lead-out line GD4 and the gate line GL2 are electrically connected to each other at the connecting portion CP4. As described above, the gate line GL2 is electrically connected to two gate lead-out lines GD3 and GD4 at two connecting portions CP3 and CP4.

With the above-mentioned configuration, two insulating films (first insulating film 232 and second insulating film 233) are interposed between the gate lead-out line GD and the source line SL, and hence formation of a capacitance between the gate lead-out line GD and the source line SL can be prevented.

Further, as illustrated in FIG. 7 to FIG. 9, each gate lead-out line GD is formed so as to have a width Wd equal to or less than a width Ws of each source line SL (Wd≤Ws). For example, the width Wd of the gate lead-out line GD and the width Ws of the source line SL are both set to 3.5 μm. Further, each gate lead-out line GD and each source line SL are formed to overlap with each other in plan view. For example, each gate lead-out line GD is formed so that the width center thereof substantially matches with the width center of each source line SL. With this, the gate lead-out line GD and a region between the source lines SL (aperture region) do not overlap with each other, and hence reduction in pixel aperture ratio due to formation of the gate lead-out line GD can be prevented.

In this case, a width Wg of the gate line GL is larger than the width Ws of the source line SL and the width Wd of the gate lead-out line GD, and is set to, for example, 18.5 µm. In general, a resistance to a signal (wiring resistance) is increased or decreased based on the length and the width (sectional area) of the wiring through which the signal flows. In this liquid crystal display device 100, the width of the gate lead-out line GD (=3.5 µm) is smaller than the width Wg (=18.5 µm) of the gate line GL. Therefore, for example, the resistance to the gate signal in one gate lead-out line GD is about three times as large as the resistance to the gate signal in one gate line GL. As a result, the entire display region is increased in resistance, which may cause display unevenness. Regarding this point, in this liquid crystal display device 100, two gate lead-out lines GD are electrically connected to one gate line GL. With this, the total width (sectional area) of the gate lead-out lines GD for one gate line GL can be increased (doubled in this case), and hence the resistance to the gate signal can be reduced. Therefore, the reduction in display quality due to display unevenness or the like can be prevented.

In this case, the number of the gate lead-out lines GD electrically connected to one gate line GL is not limited to 2, and may be 3 or more. For example, in the liquid crystal display device 100 having a screen ratio (width:height) of 16:9, four gate lead-out lines GD may be electrically connected to one gate line GL.

Further, it is preferred that the gate lead-out lines GD be arranged in a layer below all of the source lines SL. In this configuration, a gate signal may not be supplied to one of the gate lead-out lines GD. For example, a gate signal may not be supplied to a gate lead-out line GD at which the connecting portion CP is not arranged. With this, the height of the layer can be equalized in the entire display region.

Further, in this liquid crystal display device 100, it is not necessary to electrically connect the plurality of gate lead-out lines GD to each of all of the gate lines GL. For example, in the upper region of the display region 300, one gate lead-out line GD may be electrically connected to one gate line GL, and in the center region of the display region 300, two gate lead-out lines GD may be electrically connected to one gate line GL. Further, in the lower region of the display region 300, three gate lead-out lines GD may be electrically connected to one gate line GL. That is, the number of the gate lead-out lines GD electrically connected to the gate line GL arranged at a position far from a location where the driver IC 210 is arranged may be set to be larger than the number of the gate lead-out lines GD electrically connected to the gate line GL arranged at a position close to the location where the driver IC 210 is arranged. With this, the resistance can be equalized in the entire display region, and the display quality can be enhanced.

Figure 10:
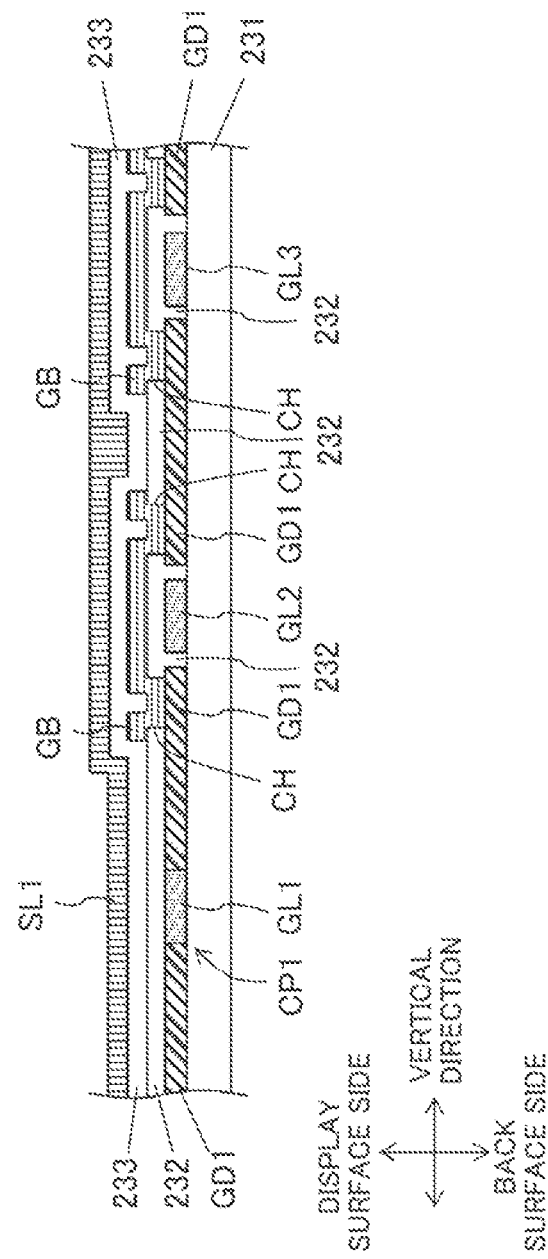
FIG. 10 is a sectional view for illustrating a schematic configuration of the display panel.

Further, in the configuration illustrated in FIG. 7 to FIG. 9, the gate line GL and the gate lead-out line GO are formed in layers different from each other through intermediation of the first insulating film 232, but the lamination structure is not limited thereto. For example, the gate line GL and the gate lead-out line GD may be formed in the same layer. FIG. 10 is a sectional view of a case where the source line SL and the gate lead-out line GD1 are cut in the vertical direction. The gate lead-cut line GD is formed in a divided manner between two adjacent gate lines GL within the same plane as the gate line GL. As illustrated in FIG. 10, the gate lines GL and the gate lead-out line GD1 may be formed on the glass substrate 231, and the first insulating film 232 may be formed so as to cover those lines. On the first insulating film 232, bridge lines GB for electrically connecting the divided gate lead-out lines GD in the vertical direction may be formed, and the second insulating film 233 may be formed so as to cover the bridge lines GB. On the second insulating film 233, the scarce line SL1 may be formed. At the connecting portion CP1, the gate lead-out line GD1 is brought into direct contact with the gate line GL1. The bridge lines GB are formed to cross over the gate lines GL2 and GL3 at the intersecting portions other than the connecting portion CP1. The bridge line GB electrically connects the two divided gate lead-out lines GD1 arranged on both sides of the gate line GL via the contact holes CH formed through the first insulating film 232.

Further, in the configuration illustrated in FIG. 7 to FIG. 9, the layer in which the gate lines GL are formed and the layer in which the gate lead-out lines GD are formed may be reversed. In this case, only one insulating film (second insulating film 233) is interposed between the source line SL and the gate lead-cut line GD, and hence it is preferred to increase the thickness of the second insulating film 233.

Figure 11:
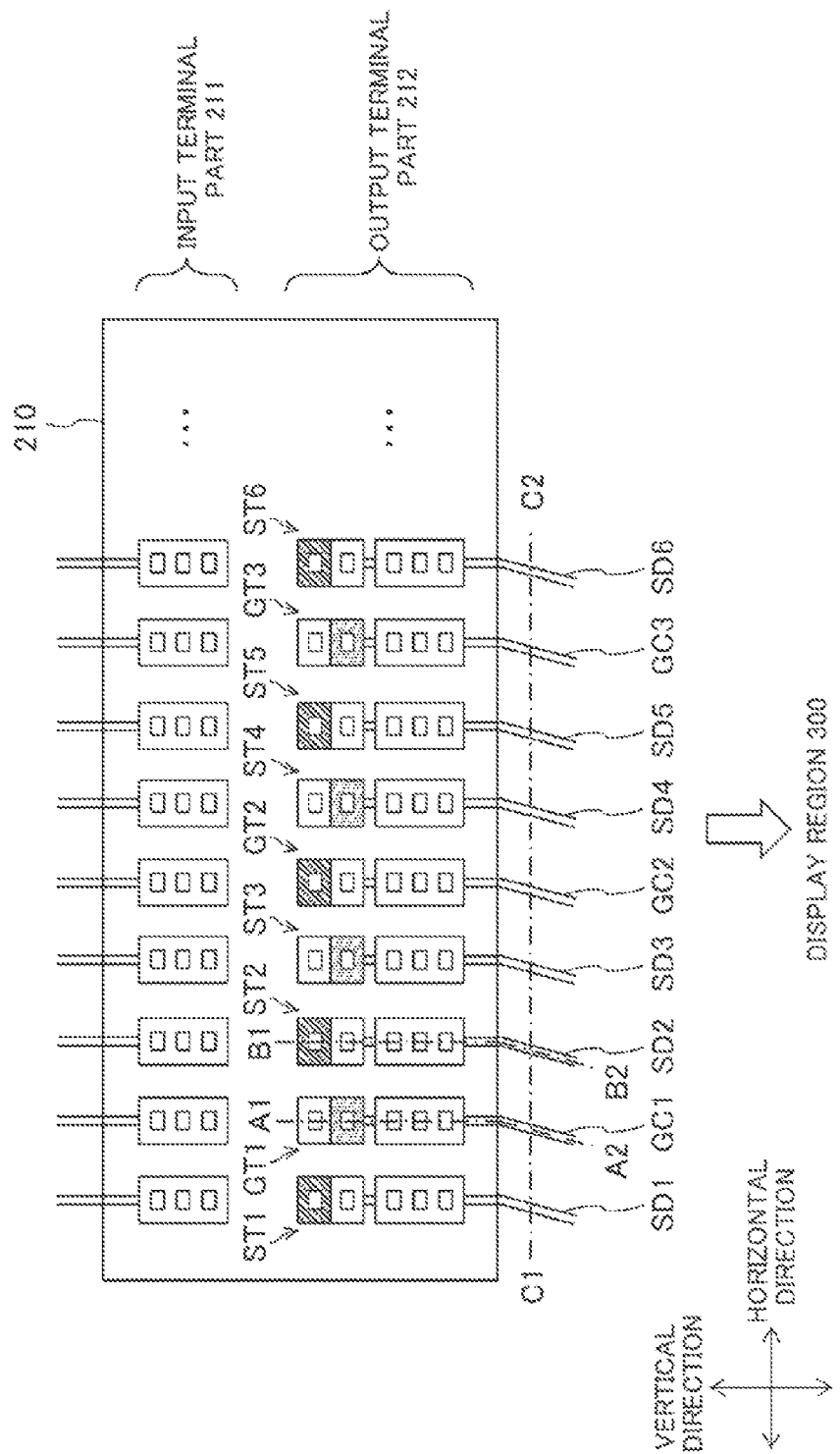
FIG. 11 is a plan view for illustrating a schematic configuration of one driver IC.

Next, the configuration of the driver IC 210 is described. FIG. 11 is a plan view for illustrating a schematic configuration of one driver IC 210.

The driver IC 210 includes an input terminal part 211 and an output terminal part 212. The input terminal part 211 is connected to, for example, flexible printed circuits (FPC), and inputs a control signal, a timing signal, a video signal, or other signals. The output terminal part 212 includes the plurality of source signal output terminals ST and the plurality of gate signal output terminals GT. Each source signal output terminal ST is electrically connected to the source lead-out line SD, and outputs the source signal to each source lead-out line SD. Each gate signal output terminal GT is electrically connected to the gate bundled line GC, and outputs the gate signal to each gate bundled line GC. The source lead-out line SD and the source line SL may be directly connected to each other in the same layer, or may be connected in different layers via a contact hole or a metal wiring. The gate bundled line GC and the gate lead-out line GD may be directly connected to each other in the same layer, or may be connected in different layers via a contact hole or a metal wiring.

In plan view, the gate signal output terminal GT is arranged between two adjacent source signal output terminals ST arranged in the horizontal direction. For example, as illustrated in FIG. 11, a gate signal output, terminal GT1 is arranged between source signal output terminals ST1 and ST2, a gate signal output terminal GT2 is arranged between source signal output terminals ST3 and ST4, and a gate signal output terminal GT3 is arranged between source signal output terminals ST5 and ST6.

In the above-mentioned configuration, one gate signal output terminal GT is arranged between two adjacent source signal output terminals ST, but the configuration of the liquid crystal display device 100 is not limited thereto. For example, two or more gate signal output terminals GT may be arranged side by side between two adjacent source signal output terminals ST.

As described above, in the liquid crystal display device 100, each driver IC 210 includes a first output terminal group including at least one gate signal output terminal GT, and a second output terminal group including at least one source signal output terminal ST. The first output terminal group is arranged between two adjacent second output terminal groups arranged in the horizontal direction. Note that, in the example of FIG. 11, the first output terminal group includes one gate signal output terminal GT, and the second output terminal group includes two source signal output terminals ST.

With the above-mentioned configuration, one driver IC includes the gate signal output terminal GT and the source signal output terminal ST, and hence the area of the driving circuit region 450 can be decreased. With this, the area of the frame region of the entire periphery of the display region can be decreased. Further, in particular, the distance from each gate signal output terminal GT to each gate lead-out line GD can be reduced, and hence the length of the gate bundled line GC forming an oblique wiring can be reduced. Further, in the frame region, the plurality of gate bundled lines GC and the plurality of source lead-out lines SD can be arranged without intersecting with each other in plan view. With this, layout of the wiring can be facilitated, thereby being capable of reducing wiring failure such as contact and disconnection. Note that, the gate bundled line GC and the source lead-out line SD may be formed in the same layer, or may be formed in different layers.

Figure 12:
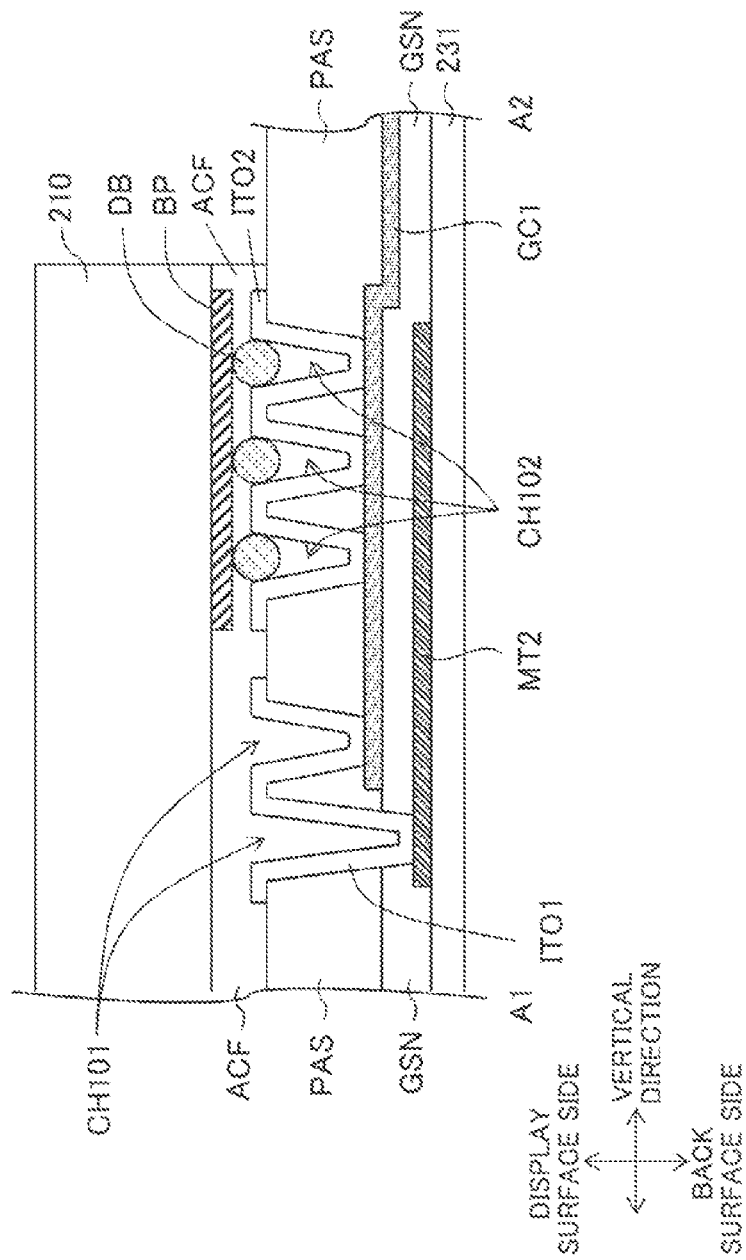
FIG. 12 is a sectional view taken along the line A1-A2 of FIG. 11.
Figure 13:
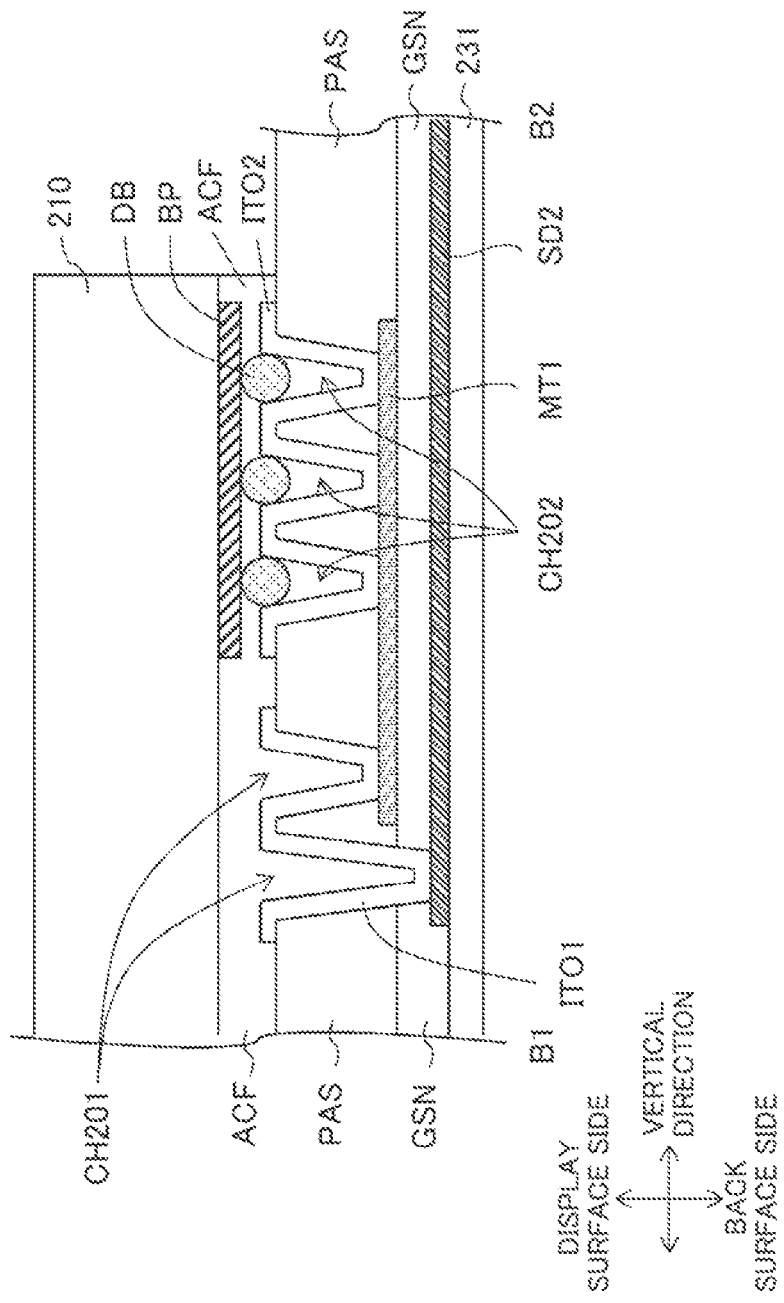
FIG. 13 is a sectional view taken along the line B1-B2 of FIG. 11.

FIG. 12 is a sectional view taken along the line A1-A2 of FIG. 11, and FIG. 13 is a sectional view taken along the line B1-B2 of FIG. 11. Now, there is described a configuration in which the plurality of lead-out wirings including the gate bundled lines GC and the source lead-out lines SD are arranged alternately in two different layers as illustrated in FIG. 14. With this configuration, contact between adjacent lead-out wirings can be prevented.

As illustrated in FIG. 12, on the glass substrate 231, a metal wiring MT2 is formed, and an insulating film GSN is formed so as to cover the metal wiring MT2. On the insulating film GSN, the gate bundled line GC1 is formed. An insulating film PAS is formed so as to cover the gate bundled line GC1. Below the driver IC 210, contact holes CH101 are formed through the insulating film GSN and the insulating film PAS, and a transparent electrode ITO1 is formed in the contact holes CH101. With this, the gate bundled line GC1 and the metal wiring MT2 are electrically connected to each other. Further, contact holes CH102 are formed through the insulating film PAS, and a transparent electrode ITO2 is formed in the contact holes CH102. Parts of conductive particles DB included in an anisotropic conductive film ACF (resin adhesive) are brought into contact with the transparent electrode ITO2, and a bump BP (for example, gold) is brought into contact with other parts of the conductive particles DB. With this, the gate bundled line GC1 and the gate signal output terminal GT are electrically connected to each other. The gate bundled line GC1 is extended to the display region 300 side to be electrically connected to the gate lead-out line GD. The gate bundled line GC1 and the gate lead-out line GD may be connected to each other via a contact hole, or may be connected to each other via a metal wiring (ITO) covering end portions of both the lines.

In the sectional configuration of FIG. 13, a metal wiring MT1 is formed so as to electrically connect the transparent electrodes ITO1 and ITO2 to each other, and the source lead-out line SD2 is formed on the glass substrate 231 to be extended to the display region 300 side. Via the conductive particles DB and the transparent electrode ITO2 formed in contact holes CH202, the metal wiring MT1 and the source signal output terminal ST are electrically connected to each other. Further, the metal wiring MT1 and the source lead-out line SD2 are electrically connected to each other via the transparent electrode ITO1 formed in contact holes CH201. With this, the source lead-out line SD2 and the source signal output terminal ST are electrically connected to each other.

The source lead-out line SD2 is extended to the display region 300 side to be electrically connected to the source line SL. The source lead-out line SD2 and the source line SL may be connected to each, other via a contact hole, or may be connected to each other via a metal wiring (ITO) covering end portions of both the lines. With the above-mentioned sectional structure, the arrangement of the lead-out wirings illustrated in FIG. 14 is realized.

Figure 15:
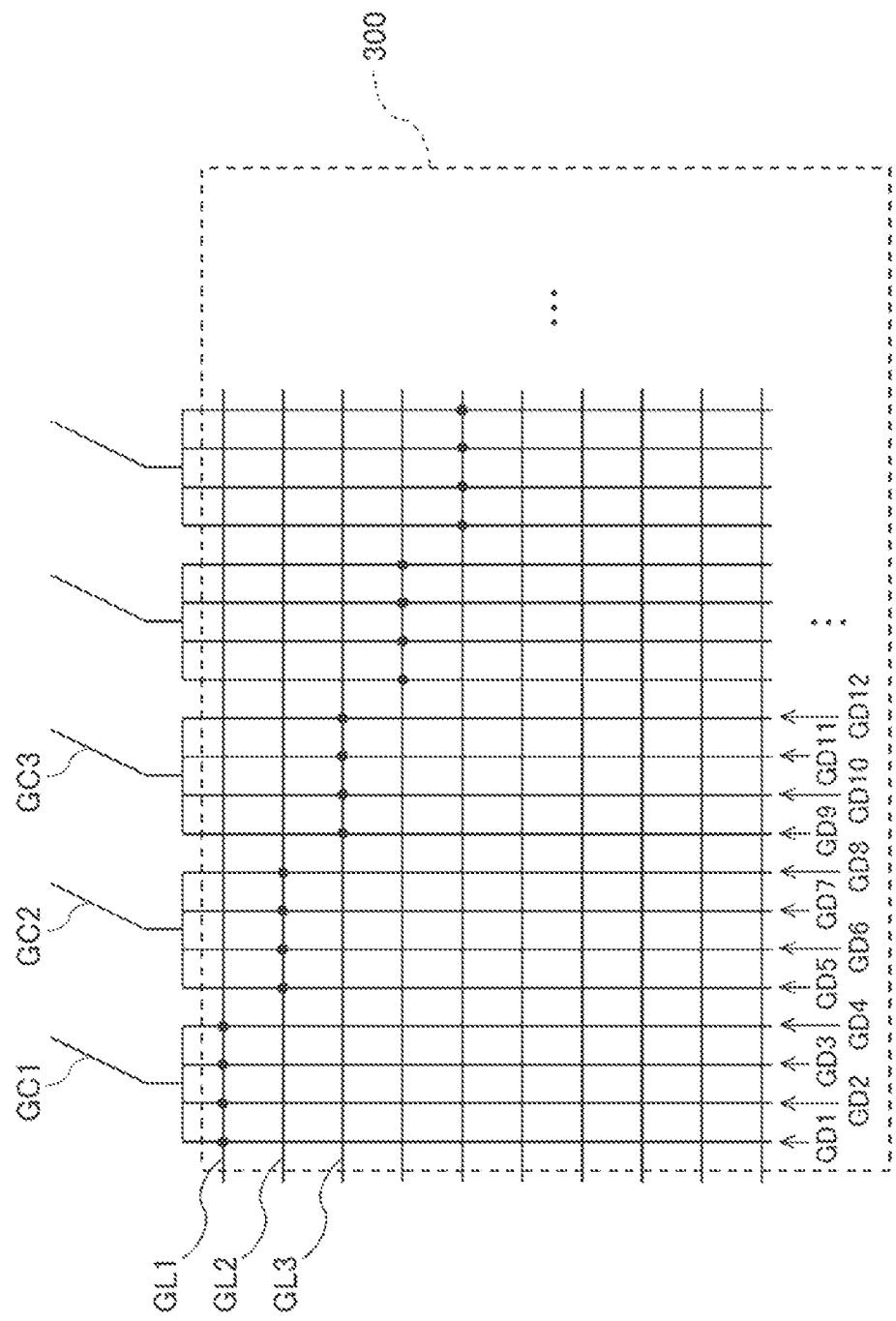
FIG. 15 is s plan view for illustrating arrangement of gate lead-out lines and gate bundled lines.

Note that, in the configuration described above, two gate lead-out lines GD are electrically connected to one gate line GL, but as another configuration, two or more gate lead-out lines GD may be electrically connected to one gate line GL. That is, in the liquid crystal display device 100, a plurality (predetermined number) of gate lead-out lines GD electrically connected to one gate line GL are bundled into one line outside the display region on the driver IC 210 side. For example, as illustrated in FIG. 15, the gate lead-out lines GD1 to GD4 electrically connected to the gate line GL1 are bundled into one gate bundled line GC1, the gate lead-out lines GD5 to GD8 electrically connected to the gate line GL2 are bundled into one gate bundled line GC2, and the gate lead-out lines GD9 to GD12 electrically connected to the gate line GL3 are bundled into one gate bundled line GC3.

With the configuration of the first embodiment described above, the number of the gate bundled lines GC to be connected to the gate signal output terminals GT of the driver IC 210 can be reduced, and hence the number of the wirings in the driving circuit region 450 can be reduced. Further, the region in the outer periphery of the display region 300 serves as a sealing region for sealing a liquid crystal material. With the above-mentioned configuration, the number of wirings can be reduced, and hence the sealing region can be secured wide.

Note that, the plurality of driver ICs 210 may respectively have the same configuration, or may have configurations different from each other. The gate signal output terminals GT and the source signal output terminals ST of the driver IC 210 are arranged based on the number of the gate lead-out lines GD electrically connected to one gate line GL and the arrangement of the connecting portions CP. For example, when three gate lead-out lines GD are electrically connected to the first gate line GL arranged at a position far from the driving circuit region 450 and two gate lead-out lines GD are electrically connected to the second gate line GL arranged at a position close to the driving circuit region 450, in the driver IC 210 corresponding to the first gate line GL, the gate signal output terminals GT are arranged at intervals of three source signal output terminals ST, and in the driver IC 210 corresponding to the second gate line GL, the gate signal output terminals GT are arranged at intervals of two source signal output terminals ST.

The liquid crystal display device 100 is not limited to the first embodiment, and the following modes can be employed. In the following, differences from the first embodiment are mainly described.

Second Embodiment

Figure 16:
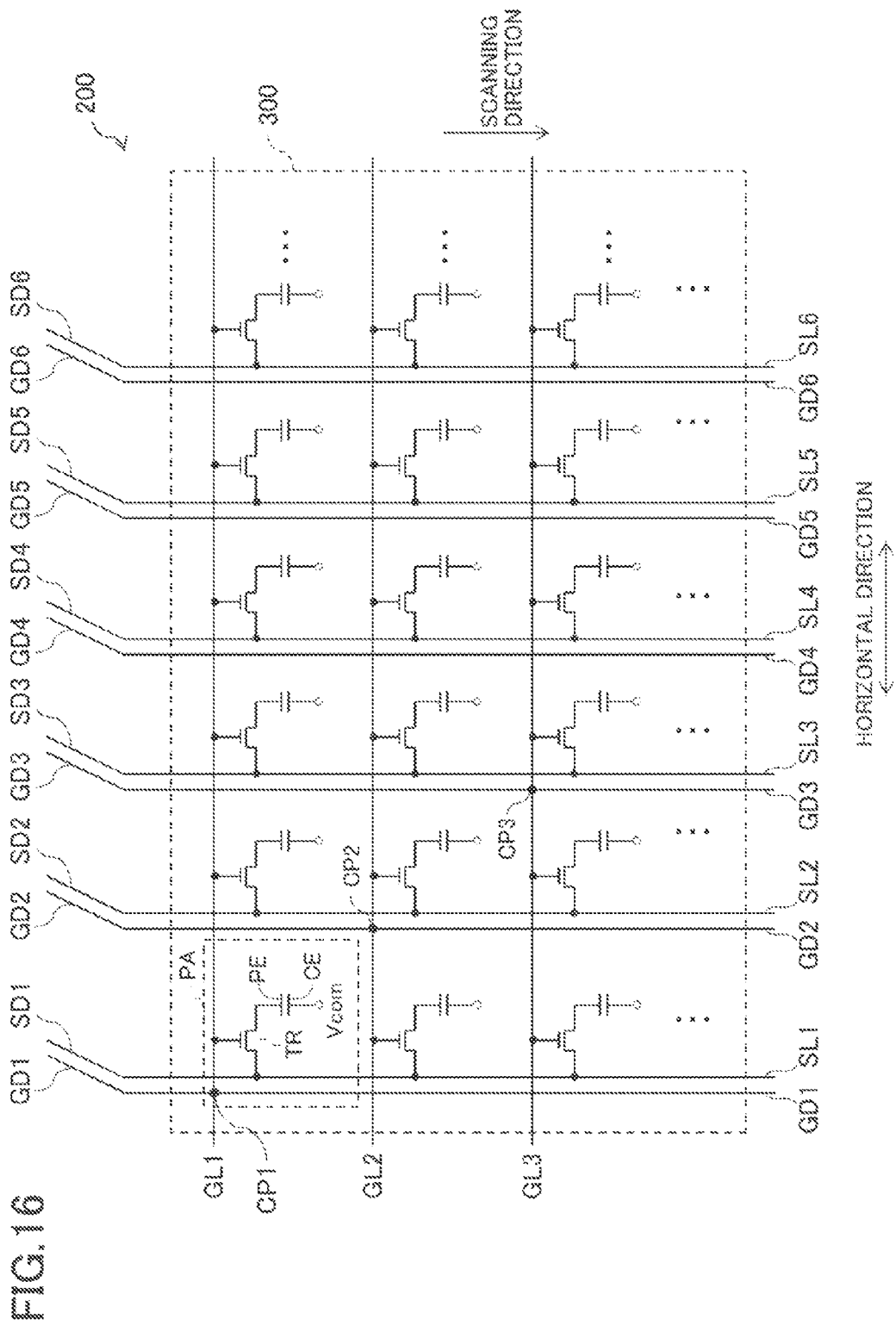
FIG. 16 is a plan view for illustrating a schematic configuration of the pixel regions of in the liquid crystal display device according to a second embodiment of the present application.

FIG. 10 is a circuit diagram for illustrating a schematic configuration of the pixel regions of the display panel 200 in the liquid crystal display device 100 according to a second embodiment of the present application. In the liquid crystal display device 100 according to the second embodiment, each gate lead-out line GD is connected to each gate signal output terminal GT. Further, one gate lead-out line GD is electrically connected to each gate line GD. For example, as illustrated in FIG. 16, the gate lead-out line GD1 is electrically connected to the gate line GD1 at the connecting portion CP1, the gate lead-out line GD2 is electrically connected to the gate line GL2 at the connecting portion CP2, and the gate lead-out line GD3 is electrically connected to the gate line GL3 at the connecting portion GP3. The gate lead-out line GD and the source line SL may be arranged to overlap with each other in plan view, or may be arranged parallel side by side.

Further, each gate lead-out line GD is connected to each gate signal output terminal GT. In the driver IC 210, the source signal output terminals ST and the gate signal output terminals GT are arranged alternately in the horizontal direction.

Figure 17:
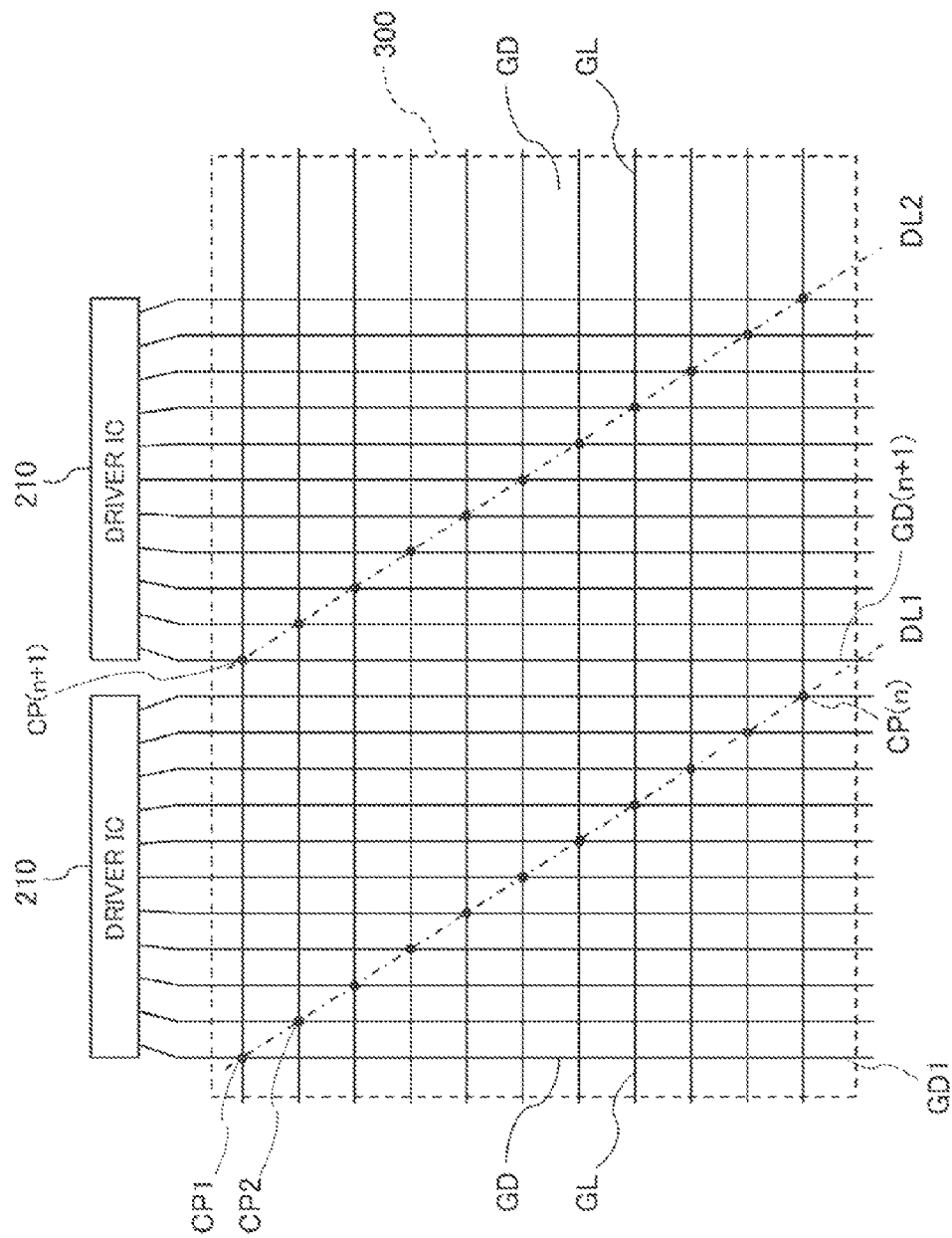
FIG. 17 is a plan view for illustrating arrangement of the driver ICs and the gate lead-out lines.

In the liquid crystal display device 100 according to the second embodiment, the number of gate lead-out lines GD to be electrically connected to one gate line GL may be 2 or more. For example, as illustrated in FIG. 17, two gate lead-out lines GD may be electrically connected to each gate line GL. In the configuration of FIG. 17, the respective driver ICs 210 output a gate signal at the same timing. For example, the gate signal output terminal GT1 of the left driver IC 210 and the gate signal output terminal GT(n+1) of the right driver IC 210 output the same gate signal at the same timing to the gate lead-out lines GD1 and GD(n+1), respectively.

Figure 18:
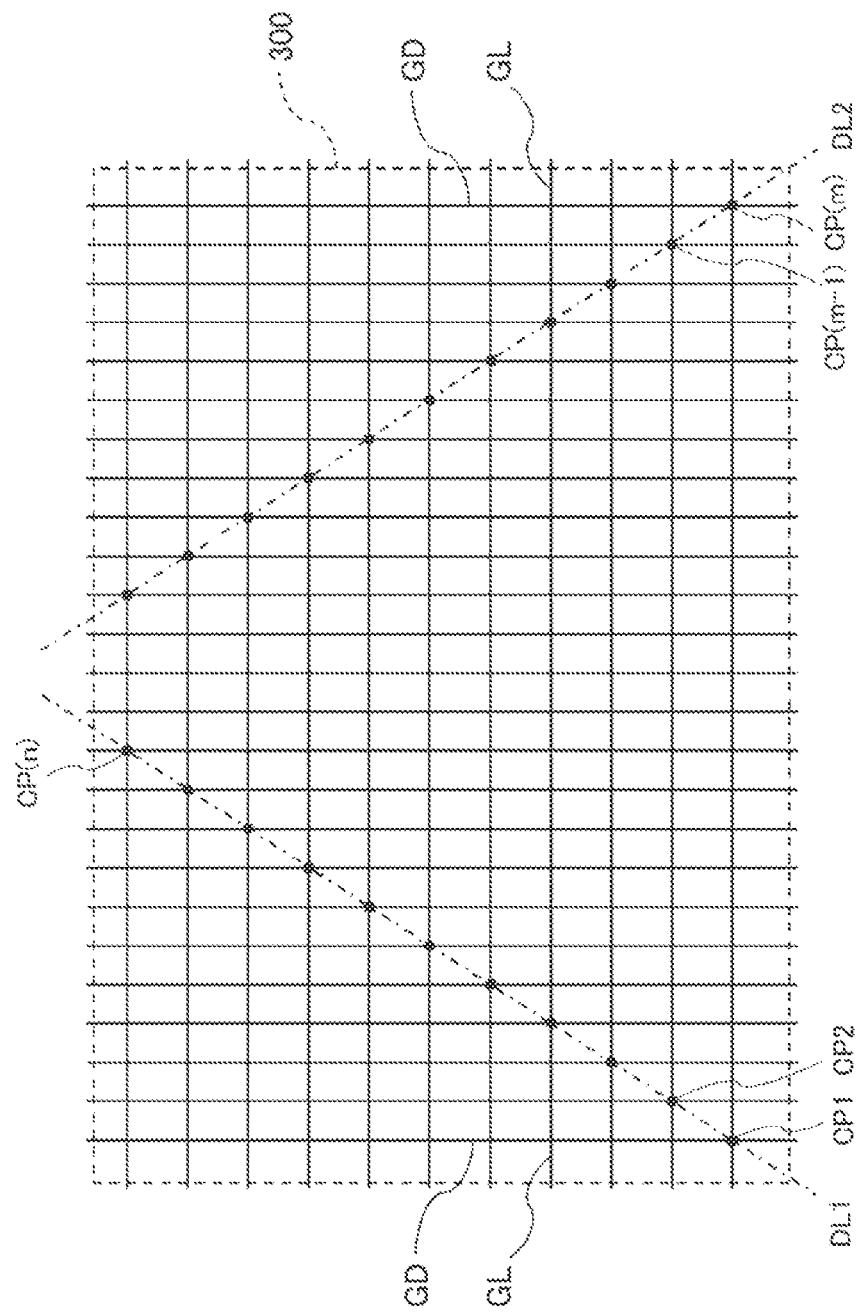
FIG. 18 is a plan view for illustrating arrangement of the connecting portions.

The arrangement of the connecting portions CP in the liquid crystal display device 100 according to the second embodiment is not limited to that in FIG. 17. In the configuration of FIG. 17, the connecting portions CP are arranged so that the diagonal lines DL1 and DL2 are parallel to each other, but as illustrated in FIG. 18, the connecting portions CP may be arranged so as to prevent the diagonal lines DL1 and DL2 from being parallel to each other. Specifically, in the display region 300, the connecting portion GP1 is arranged at the lower left end, the connecting portion CP2 is arranged at the upper right of the connecting portion CP1, and the respective connecting portions CP are arranged on the upward-sloping diagonal line DL1. Further, the connecting portion CP(m) is arranged at the lower right end of the display region 300, the connecting portion CP(m−1) is arranged at the upper left of the connecting portion CP (m), and the respective connecting portions CP are arranged on the downward-sloping diagonal line DL2. The above-mentioned variable "m" represents the number of the source lines SL.

In this case, in a configuration in which two gate lead-out lines GD are electrically connected to one gate line GL, when the number (2n) that is twice the number (n) of the gate lines GL is smaller than the number (m) of the source lines SL (2n<m), there are source lines SL not overlapping with the connecting portion CP. In other words, when the gate lead-out lines GD are arranged in a layer below all of the source lines SL, there are dummy gate lead-out lines GD to which the gate signal is not output (not including the connecting portion CP). In this case, it is preferred that the connecting portions CP be arranged from both end sides of the display region 300 so as to prevent the connecting portions CP from being arranged in the center region. In the example of FIG. 18, the connecting portions CP are prevented from being arranged at three center-side source lines SL and three center-side gate lead-out lines GD.

As described above, the connecting portions CP are arranged so that the distance from the driver IC 210 to the connecting portion CP is increased as being distanced from the center toward both the sides of the display region 300.

With the above-mentioned configuration, the resistance can be equalized in the entire display region, and the display quality can be enhanced.

Third Embodiment

Figure 19:
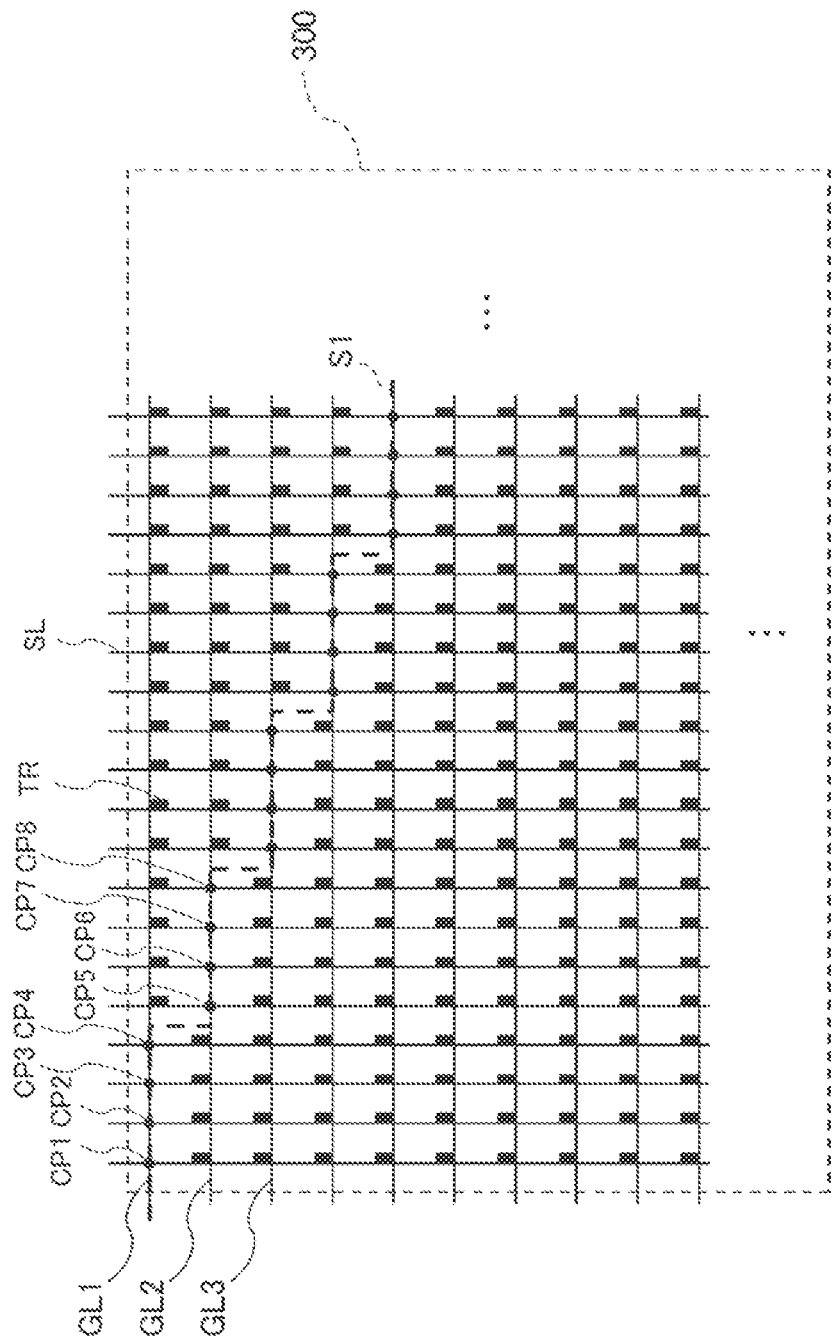
FIG. 19 is a plan view for illustrating arrangement of transistors in the liquid crystal display device according to a third embodiment of the present application.

FIG. 19 is a plan view for illustrating arrangement of the transistors TR in the liquid crystal display device 100 according to a third embodiment of the present application. FIG. 19 is an illustration of a case where she arrangement of the connecting portions CP is the configuration of FIG. 15, and is an illustration of positions of the connecting portions CP, and the gate lines GL and the source lines 31 connected to the transistors TR. In the liquid crystal display device 100 according to the third embodiment, in the pixel region PA in which the connecting portion CP is arranged, the transistor TR is arranged at the intersecting portion at which the connecting portion CP is not arranged among the four intersecting portions at which two gate lines GL and two source lines SL intersect with each other. For example, as illustrated in FIG. 19, in a region on the upper side with respect to a boundary line S1 obtained by connecting the adjacent connecting portions CP, the transistor TR is arranged at the intersecting portion at the upper left end of the pixel region PA, and in a region on the lower side with respect to the boundary line S1, the transistor TR is arranged at the intersecting portion at the lower left end of the pixel region PA.

With the above-mentioned configuration, a distance between the connecting portion CP and the transistor TR can be increased, and hence the potential fluctuations due to the interference of the gate signal and the source signal can be suppressed.

Figure 20:
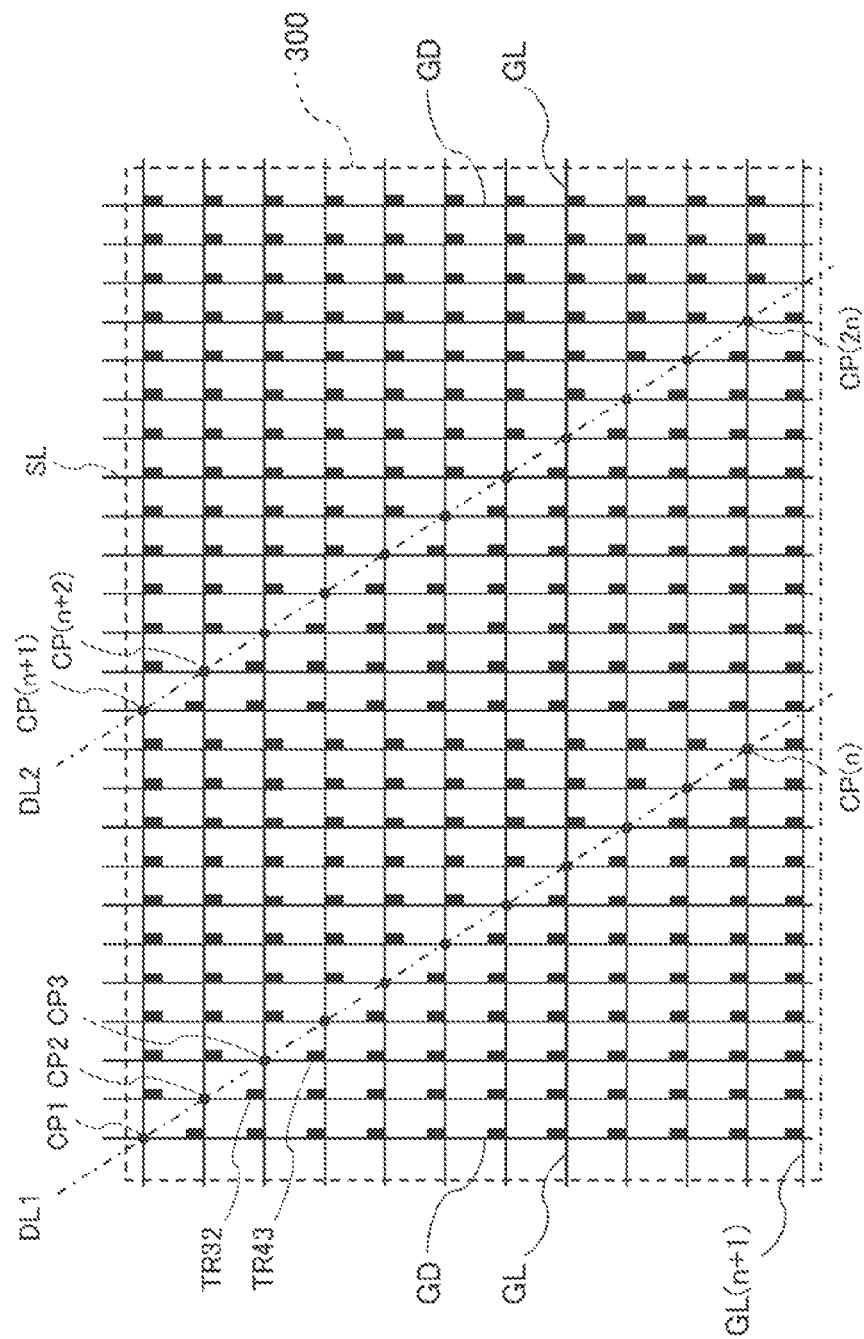
FIG. 20 is a plan view for illustrating other arrangement of the transistors.
Figure 21:
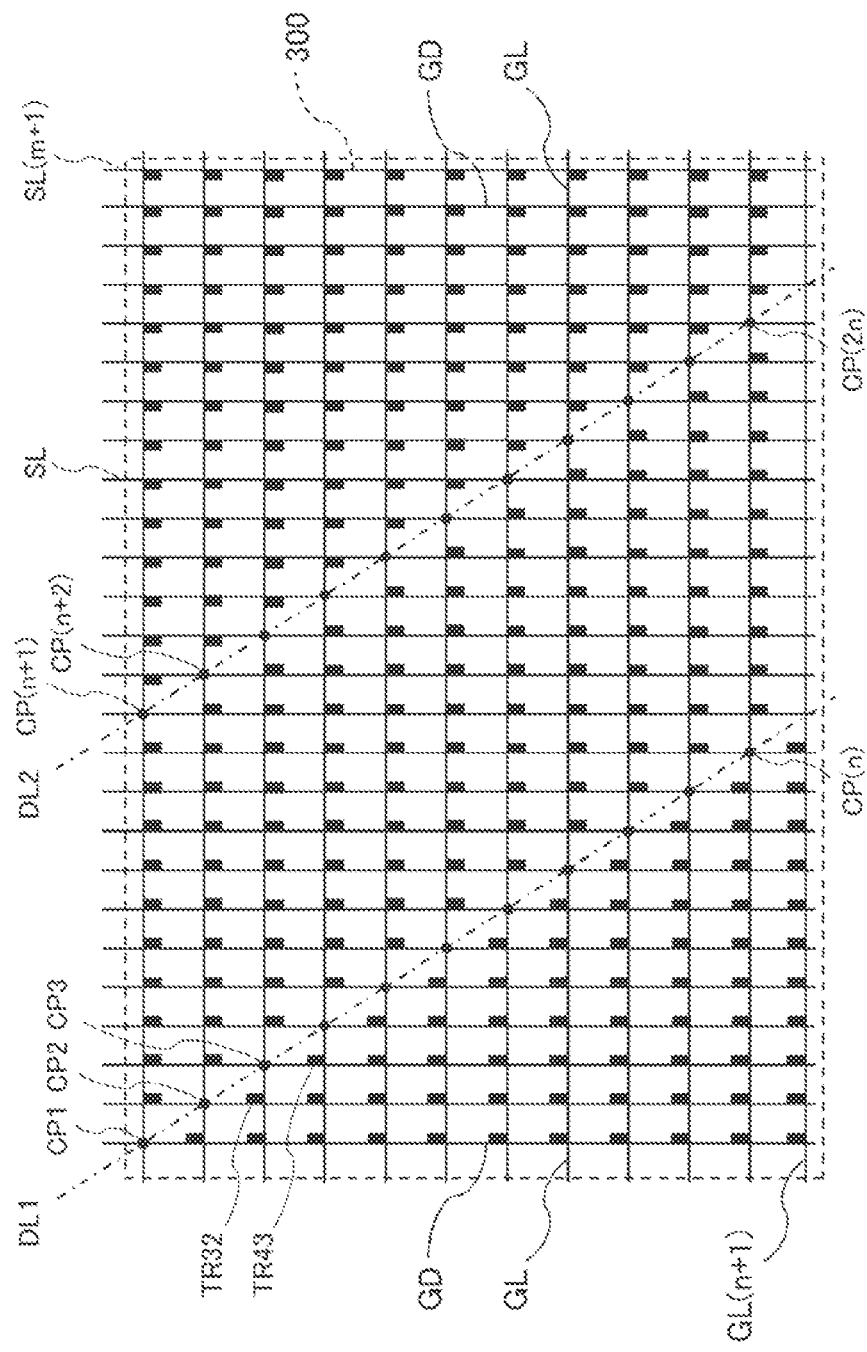
FIG. 21 is a plan view for illustrating other arrangement of the transistors.

The arrangement of the transistors TR is not limited to the above-mentioned configuration. For example, when the arrangement of the connecting portions CP is the configuration illustrated in FIG. 17, as illustrated in FIG. 20, in regions on the vertically upper side with respect to the diagonal lines DL1 and DL2, the transistor TR may be arranged at the intersecting portion at the upper left end of the pixel region PA, and in regions on the vertically lower side with respect to the diagonal lines DL1 and DL2, the transistor TR may be arranged at the intersecting portion at the lower left end of the pixel region PA. Further, as illustrated in FIG. 21, in a region on the vertically lower side with respect to the diagonal line DL1, the transistor TR may be arranged at the intersecting portion at the lower left end of the pixel region PA, and in a region between the diagonal lines DL1 and DL2, the transistor TR may be arranged at the intersecting portion at the upper left end of the pixel region PA. Further, in a region on the vertically upper side with respect to the diagonal line DL2, the transistor TR may be arranged at the intersecting portion at the upper right end of the pixel region PA.

Fourth Embodiment

FIG. 22 is a sectional view in the liquid crystal display device 100 according to a fourth embodiment of the present application. FIG. 22 is a sectional view of a case where a region along the gate line GL1 is cut in the horizontal direction. In the TFT substrate 230 of the liquid crystal display device 100 according to the fourth embodiment, first gate lead-out lines GDa are formed on the glass substrate 231, the first insulating film 232 is formed so as to cover the first gate lead-out lines GDa, the gate lines GL are formed on the first insulating film 232, the second insulating film 233 is formed so as to cover the gate lines GL, second gate lead-out lines GDb are formed on the second insulating film 233, a fourth insulating film 237 is formed so as to cover the second gate lead-out lines GDb, and the source lines SL are formed on the fourth insulating film 237. Further, as illustrated in FIG. 22, a contact hole CH1a is formed through the first insulating film 232 above a first gate lead-out line GDa1, and a metal material of the gate line GL1 is filled in the contact hole CH1a. Further, a contact hole CH1b is formed through the second insulating film 233 above the gate line GL1, and a metal material of a gate lead-out line GDb1 is filled in the contact hole CH1b. Parts of the contact holes CH1a and GH1b where the gate lead-out lines GDa1 and GDb1 and the metal material of the gate line GL1 are brought into contact with each other form the connecting portion CP1. At the connecting portion CP1, the two gate lead-out lines GDa1 and GDb1 and the gate line GL1 are electrically connected to each other.

As described above, the two gate lead-out lines CD may overlap with each, other in plan view, and those lines may be electrically connected to one gate line GL at one connecting portion CP. With this configuration, the present application can also be applied to, for example, a liquid crystal display device having a vertically-long display region 300, in which the number (n) of the gate lines GL is larger than the number (m) of the source lines SL (n>m).

The liquid crystal display devices according to the above-mentioned respective embodiments can be combined with each other in configuration. Further, the respective liquid crystal display devices can be applied to liquid crystal display devices of various modes.

For example, the present application can also be applied to a so-called two-line simultaneous drive liquid crystal display device configured to simultaneously drive two adjacent gate lines GL. In this case, each gate lead-out line GD can be electrically connected to two adjacent gate lines at two connecting portions CP adjacent to each other in the vertical direction.

Further, the present application can also be applied to a so-called vertical divisional drive liquid crystal display device configured to vertically divide the display region to drive the divided regions. In this case, each gate lead-out line GD can be electrically connected to one gate line GL at the connecting portion CP in the upper region, and can be electrically connected to another line GL at the connecting portion CP in the lower region.

With the configuration of the display device according to the present application, the area of the frame region surrounding the display region can be decreased.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device, comprising:
   a plurality of gate lines extending in a first direction;
   a plurality of source lines extending in a second direction different from the first direction;
   a driving circuit comprising:
     a first output terminal group comprising at least one gate signal output terminal configured to output a gate signal; and
     a second output terminal group comprising at least one source signal output terminal configured to output a source signal; and
   a plurality of gate lead-out lines extending in the second direction and being configured to transmit the gate signal output from the at least one gate signal output terminal to the plurality of gate lines,
   wherein each of the plurality of gate lines is electrically connected to at least one of the plurality of gate lead-out lines,
   the first output terminal group is arranged between two second output terminal groups adjacent to each other in the first direction,
   the plurality of gate lead-out lines includes a first gate lead-out line and a second gate lead-out line that are electrically independent from each other,
   the plurality of gate lines includes a first gate line and a second gate line,
   the first gate lead-out line is electrically connected with the first gate line,
   the second gate lead-out line is electrically connected with the second gate line, and
   the first gate lead-out line is not electrically connected with the second gate line.

2. The display device according to claim 1, further comprising a plurality of source lead-out lines configured to transmit the source signal output from the at least one source signal output terminal to the plurality of source lines,
   wherein, outside a display region, the plurality of source lead-out lines and the plurality of gate lead-out lines are arranged so as to avoid intersecting with each other in plan view.

3. The display device according to claim 1, wherein at least one of the plurality of gate lines is electrically connected to at least two of the plurality of gate lead-out lines.

4. The display device according to claim 1, further comprising a plurality of gate bundled lines formed by bundling a predetermined number of the plurality of gate lead-out lines outside a display region,
   wherein each of the plurality of gate bundled lines is electrically connected to each of a plurality of the gate signal output terminals, and is configured to transmit the gate signal output from each of the plurality of the gate signal output terminals to the predetermined number of the plurality of gate lead-out lines.

5. The display device according to claim 4, wherein the each of the plurality of gate bundled lines is formed by bundling a plurality of adjacent gate lead-out lines outside the display region.

6. The display device according to claim 5, further comprising a plurality of source lead-out lines configured to transmit the source signal output from the at least one source signal output terminal to the plurality of source lines,
   wherein, outside the display region, the plurality of source lead-out lines and the plurality of gate bundled lines are arranged so as to avoid intersecting with each other in plan view.

7. The display device according to claim 1, further comprising a first insulating film formed between the plurality of gate lines and the plurality of gate lead-out lines,
   wherein the each of the plurality of gate lines and each of the plurality of gate lead-out lines are electrically connected to each other via a contact hole formed through the first insulating film.

8. The display device according to claim 1,
   wherein each of the plurality of gate lead-out lines has a width that is equal to or less than a width of each of the plurality of source lines, and wherein, inside a display region, the each of the plurality of gate lead-out lines and the each of the plurality of source lines overlap with each other in plan view.

9. The display device according to claim 7, further comprising a second insulating film formed between the plurality of gate lines and the plurality of source lines,
wherein the first insulating film is formed on the plurality of gate lead-out lines,
wherein the plurality of gate lines are formed on the first insulating film,
wherein the second insulating film is formed on the plurality of gate lines, and
wherein the plurality of source lines are formed on the second insulating film.

10. The display device according to claim 1, further comprising a transistor connected to a pixel electrode in a pixel region sectioned by adjacent two of the plurality of source lines, adjacent two of the plurality of gate lines, and four intersecting portions at which the adjacent two of the plurality of source lines and the adjacent two of the plurality of gate lines intersect with each other, wherein the transistor being arranged at one intersecting portion different from another intersecting portion at which a connecting portion formed between corresponding one of the plurality of gate lines and corresponding one of the plurality of gate lead-out lines is positioned.

* * * * *